United States Patent
Palese et al.

(10) Patent No.: US 11,962,346 B2
(45) Date of Patent: Apr. 16, 2024

(54) PHOTONIC INTEGRATED CIRCUIT (PIC)-BASED OPTICAL PHASED ARRAY WITH INTEGRATED GYROSCOPIC SENSOR

(71) Applicant: Raytheon Company, Waltham, MA (US)

(72) Inventors: Stephen P. Palese, Redondo Beach, CA (US); Duane D. Smith, Rancho Palos Verdes, CA (US); Amit Bhatia, Cerritos, CA (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/819,740

(22) Filed: Aug. 15, 2022

(65) Prior Publication Data

US 2024/0056184 A1 Feb. 15, 2024

(51) Int. Cl.
*H04B 10/112* (2013.01)
*G02B 6/35* (2006.01)

(52) U.S. Cl.
CPC ......... *H04B 10/1129* (2013.01); *G02B 6/359* (2013.01); *H04B 10/1127* (2013.01)

(58) Field of Classification Search
CPC .. H04B 10/1129; H04B 10/1127; G02B 6/359
USPC ....................................................... 398/115
See application file for complete search history.

(56) References Cited

U.S. PATENT DOCUMENTS

| | | | |
|---|---|---|---|
| 6,429,939 B1 | 8/2002 | Bennett et al. | |
| 7,106,448 B1 | 9/2006 | Vawter et al. | |
| 9,813,151 B2 | 11/2017 | Kingsbury et al. | |
| 2014/0211193 A1* | 7/2014 | Bloom | G01B 11/2527 356/5.01 |
| 2018/0039154 A1* | 2/2018 | Hashemi | G02F 1/2955 |
| 2018/0107091 A1* | 4/2018 | Hosseini | G02F 1/292 |
| 2021/0116246 A1* | 4/2021 | Paniccia | G01C 19/727 |
| 2022/0155419 A1* | 5/2022 | Yu | G01S 7/4817 |
| 2022/0224413 A1 | 7/2022 | Shamee | |
| 2022/0229343 A1 | 7/2022 | Kendrick et al. | |
| 2022/0244578 A1 | 8/2022 | Palese et al. | |
| 2022/0252786 A1 | 8/2022 | Yengst et al. | |
| 2022/0252908 A1 | 8/2022 | Inamdar et al. | |

(Continued)

FOREIGN PATENT DOCUMENTS

| | | | | |
|---|---|---|---|---|
| EP | 3783387 A1 * | 2/2021 | | G01S 17/10 |
| JP | 6513884 B1 * | 5/2019 | | |

OTHER PUBLICATIONS

Ma et al; Smart meta surface with self-adaptively reprogrammable functions; 2019; Open Access; pp. 1-12. (Year: 2019).*

(Continued)

*Primary Examiner* — Amritbir K Sandhu

(57) ABSTRACT

An apparatus includes a photonic integrated circuit having an optical phased array, where the optical phased array includes multiple unit cells. Each unit cell includes (i) an antenna element configured to transmit or receive optical signals and (ii) a phase modulator configured to modify phases of the optical signals being transmitted or received by the antenna element. The apparatus also includes a gyroscopic sensor configured to sense movement of the photonic integrated circuit, where at least a portion of the gyroscopic sensor is integrated within the photonic integrated circuit.

20 Claims, 13 Drawing Sheets

(56) References Cited

U.S. PATENT DOCUMENTS

2022/0255219 A1 8/2022 Kendrick et al.
2022/0255221 A1* 8/2022 Palese .................. H01Q 3/2676
2023/0344517 A1* 10/2023 Palese .................. H04B 10/118

OTHER PUBLICATIONS

Zhang et al; AI empowered metasurfaces; Official Journal of the CIOMP; May 2020; pp. 1-4. (Year: 2020).*
Lin et al; High-performance optical beam steering with nanophotonics ; 2022; Nano photonics; pp. 1-22. (Year: 2022).*
Zhang1 et al; An optically driven digital meta surface for programming electromagnetic functions ; Mar. 2020; Nature Electronics; pp. 1-8. (Year: 2020).*
Palese et al., "Photonic Integrated Circuit with Independent Unit Cells Having Multi-Polarization Sensitivity," U.S. Appl. No. 17/654,200, filed Mar. 9, 2022, 44 pages.
Palese et al., "Photonic Integrated Circuit-Based Polarization-Independent Optical Devices," U.S. Appl. No. 17/659,789, filed Apr. 19, 2022, 44 pages.
Palese, "Photonic Integrated Circuit Multi-Wavelength Phase Modulator Networks," U.S. Appl. No. 17/806,873, filed Jun. 14, 2022, 53 pages.
Palese, "Photonic Integrated Circuit-Based Optical Communication Optimized for Receive Aperture Amplitude and Phase Modulations," U.S. Appl. No. 17/734,887, filed May 2, 2022, 48 pages.
Palese et al., "Photonic Integrated Circuit with Inverted H-Tree Unit Cell Design," U.S. Appl. No. 17/809,608, filed Jun. 29, 2022, 48 pages.
Palese, "Photonic Integrated Circuit Temporal and Frequency Dispersion Squint Correction for Optical Phased Array," U.S. Appl. No. 17/809,073, filed Jun. 27, 2022, 51 pages.
Palese, "Photonic Integrated Circuit-Based Transmissive/Reflective Wavefront Optical Phase Control," U.S. Appl. No. 17/662,797, filed May 10, 2022, 43 pages.
Kendrick et al., "Photonic Integrated Circuit-Based Imaging Systems," U.S. Appl. No. 17/654,204, filed Mar. 9, 2022, 35 pages.

* cited by examiner

US 11,962,346 B2

PHOTONIC INTEGRATED CIRCUIT (PIC)-BASED OPTICAL PHASED ARRAY WITH INTEGRATED GYROSCOPIC SENSOR

TECHNICAL FIELD

This disclosure relates generally to optical systems. More specifically, this disclosure relates to a photonic integrated circuit (PIC)-based optical phased array with an integrated gyroscopic sensor.

BACKGROUND

Traditional free-space radio frequency (RF) communication links are at or near their maximum data capacities, and they have significantly lower bandwidths compared to their terrestrial optical fiber network counterparts. Free-space optical (FSO) laser communication transceivers are beginning to displace RF communication transceivers since laser communication transceivers enable significantly higher data rates and support directionality, which means that optical signals can often be transmitted in specific directions rather than being broadcast more widely (which typically occurs with RF transmissions). As a result, laser communication transceivers can often achieve significant reductions in the power needed per transmitted data bit.

SUMMARY

This disclosure relates to a photonic integrated circuit (PIC)-based optical phased array with an integrated gyroscopic sensor.

In a first embodiment, an apparatus includes a photonic integrated circuit having an optical phased array, where the optical phased array includes multiple unit cells. Each unit cell includes (i) an antenna element configured to transmit or receive optical signals and (ii) a phase modulator configured to modify phases of the optical signals being transmitted or received by the antenna element. The apparatus also includes a gyroscopic sensor configured to sense movement of the photonic integrated circuit, where at least a portion of the gyroscopic sensor is integrated within the photonic integrated circuit.

In a second embodiment, a method includes transmitting or receiving optical signals using a photonic integrated circuit having an optical phased array, where the optical phased array includes multiple unit cells. Each unit cell includes (i) an antenna element that transmits or receives the optical signals and (ii) a phase modulator that modifies phases of the optical signals being transmitted or received by the antenna element. The method also includes sensing movement of the photonic integrated circuit using a gyroscopic sensor, where at least a portion of the gyroscopic sensor is integrated within the photonic integrated circuit.

In a third embodiment, an optical node includes one or more optical transmitters, optical receivers, or optical transceivers. Each optical transmitter, optical receiver, or optical transceiver includes a photonic integrated circuit having an optical phased array, where the optical phased array includes multiple unit cells. Each unit cell includes (i) an antenna element configured to transmit or receive optical signals and (ii) a phase modulator configured to modify phases of the optical signals being transmitted or received by the antenna element. Each optical transmitter, optical receiver, or optical transceiver also includes a gyroscopic sensor configured to sense movement of the photonic integrated circuit, where at least a portion of the gyroscopic sensor is integrated within the photonic integrated circuit.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
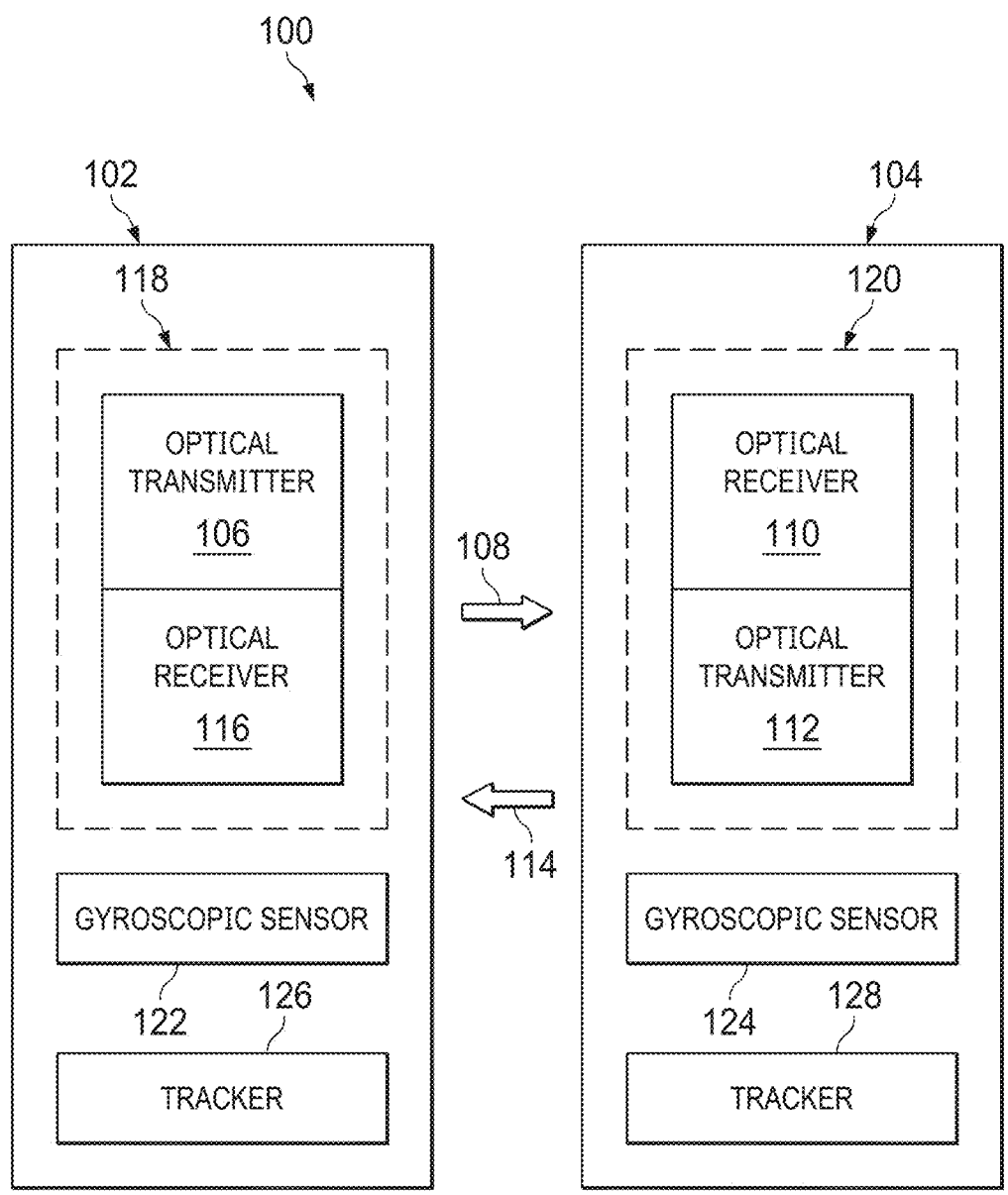
FIG. 1 illustrates an example system supporting photonic integrated circuit (PIC)-based optical phased arrays with integrated gyroscopic sensors according to this disclosure.

FIGS. 1 through 13, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, traditional free-space radio frequency (RF) communication links are at or near their maximum data capacities, and they have significantly lower bandwidths compared to their terrestrial optical fiber network counterparts. Free-space optical (FSO) laser communication transceivers are beginning to displace RF communication transceivers since laser communication transceivers enable significantly higher data rates and support directionality, which means that optical signals can often be transmitted in specific directions rather than being broadcast more widely (which typically occurs with RF transmissions). As a result, laser communication transceivers can often achieve significant reductions in the power needed per transmitted data bit.

Unfortunately, this directionally can come with significant complications. For example, optical terminals typically need to have precision relative pointing capabilities, often on the order of tens of micro-radians, in order to acquire and subsequently maintain optical communication links with one another. This becomes particularly problematic for optical terminals that can move relative to each other. One example of this involves optical communications involving satellites in low-Earth orbit (LEO) constellations or other moving optical terminals in the air or in space, since these optical terminals routinely move relative to one another. However, this can also be a problem for ground-based optical terminals, such as during ground-to-ground optical communications. For instance, when optical communications occur between two terminals mounted on cell towers, each cell tower may be able to twist and sway slightly (such as due to the wind), which can lead to misalignment of the optical terminals.

Some approaches for handling misalignments between optical terminals involve the use of rotatable gimbals, which can be used to point optical terminals in desired directions in order to support alignment of the optical terminals. Unfortunately, gimbals typically impart mechanical disturbances to optical terminals, which can lead to significant issues with optical link acquisitions. Also, the use of gimbals typically increases the size, weight, power, and cost (SWAP-C) of the optical terminals. Other approaches for handling misalignments between optical terminals attempt to use beacon optical signals to support beam steering or other alignment operations, but this may allow alignment to be lost during bad weather, temporary obscurations, or other beam blockages.

This disclosure provides optical devices that use photonic integrated circuit (PIC)-based optical phased arrays with integrated gyroscopic sensors. As described in more detail below, an optical device includes a photonic integrated circuit having multiple unit cells. Each unit cell may include (i) an antenna element that can transmit or receive optical signals and (ii) a phase modulator that can be used to adjust the phases of the optical signals that are transmitted or received by the antenna element. Among other things, phase adjustments can be used to steer optical signals in desired directions, which can be accomplished without using mechanical movements like those imparted using gimbals. Moreover, a gyroscopic sensor, such as one included in an inertial reference gyroscopic unit (IRGU) or other gyroscopic circuitry, can be integrated into the photonic integrated circuit itself. The gyroscopic sensor can be used to precisely sense movements of the photonic integrated circuit. A tracker associated with the optical device can also be used to track a reference position, and the tracker can produce precise measurements of how the gyroscopic sensor moves or is displaced relative to the reference position (thereby compensating for gyroscopic drift). In some embodiments, the tracker may represent a star tracker for space-based applications. In other embodiments, the tracker may represent a camera that is used with a ground-based illumination optical reference system. By using the movements sensed by the gyroscopic sensor and the movements sensed by the tracker, the optical device can precisely estimate its movement relative to another optical device, and phase adjustments can be made to optical signals being transmitted or received by the photonic integrated circuit over an optical link. This can help to maintain the optical link, even in the presence of motion of one or more of the optical devices.

In this way, the described approaches enable precision measurements of the orientation changes of photonic integrated circuits specifically or associated optical devices generally. This enables the photonic integrated circuits to compensate for the orientation changes, such as by adjusting the phases of optical signals being transmitted or received by the optical phased arrays. This helps to maintain alignment of multiple optical devices much more easily and allows corrections to be made much more quickly and robustly. In some cases, beacons can be incorporated into PIC-based transceivers in order to facilitate higher-speed feedback related to relative terminal drifts, which can enable features such as "look ahead" capabilities. Moreover, integrating a gyroscopic sensor into a photonic integrated circuit can eliminate boresight errors that might otherwise result if the photonic integrated circuit and the gyroscopic sensor are implemented as physically-separate components (each of which can have locally-varying vibrational and thermal disturbances). In addition, reducing or eliminating the usage of gimbals or other mechanical redirection mechanisms can help to reduce or eliminate imparted disturbances that can affect link acquisition and tracking operations.

FIG. 1 illustrates an example system 100 supporting PIC-based optical phased arrays with integrated gyroscopic sensors according to this disclosure. As shown in FIG. 1, the system 100 includes two nodes 102 and 104 that communicate with one another optically. Each node 102 and 104 represents a ground-, air-, or space-based system that can transmit or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes.

As described in more detail below, each optical transmitter 106 and 112, optical receiver 110 and 116, or optical transceiver 118 and 120 may be implemented using at least one PIC-based optical phased array, which is used to transmit or receive the optical signals 108 and 114. At least one PIC-based optical phased array may be implemented using a photonic integrated circuit that includes integrated gyroscopic functionality. For example, in the node 102, a gyroscopic sensor 122 may be integrated within a photonic integrated circuit that implements the optical transmitter 106, optical receiver 116, or optical transceiver 118. Similarly, in the node 104, a gyroscopic sensor 124 may be integrated within a photonic integrated circuit that implements the optical transmitter 112, optical receiver 110, or optical transceiver 120. Each gyroscopic sensor 122 and 124 can be used to sense movements of the photonic integrated circuit or the associated node 102 and 104. Each gyroscopic sensor 122 and 124 includes any suitable structure configured to sense movement of an optical node.

Each node 102 and 104 also respectively includes a tracker 126 and 128. Each tracker 126 or 128 can be used to sense a reference position and identify how the photonic integrated circuit or the associated node 102 and 104 moves or is displaced from the reference position. This provides a measure of how the gyroscopic sensor in the photonic integrated circuit of the associated node 102 or 104 drifts from the reference position. Each tracker 126 or 128 may use any suitable technique to identify a reference position. In some cases, each tracker 126 or 128 may represent a star tracker, which allows the positions of multiple stars to be used. In other cases, each tracker 126 or 128 may represent a camera used with a ground-based illumination optical reference system, which allows illumination from the optical reference system to be used. Note, however, that any other suitable tracker or tracking technique may be used here.

Measurements from the gyroscopic sensor 122 or 124 and the associated tracker 126 or 128 in each node 102 or 104 can be used to provide precision information regarding orientation changes or other movements of that node 102 or 104. That precision information can therefore be used to compensate for the orientation changes or other movements, such as by adjusting the phases of antenna elements in the photonic integrated circuit of that node 102 or 104. In other words, this allows the photonic integrated circuit in the associated node 102 or 104 to adjust how optical signals are transmitted to or received from another node. This helps the nodes 102 and 104 to maintain the optical link(s) used to exchange the optical signals 108 and 114 between the nodes 102 and 104, even in the presence of movement of one or both nodes 102, 104 relative to each other. The ability to combine gyroscopic and tracking measurements can help to compensate for gyroscopic drifts, which can help to ensure long-term angular accuracy in order to maintain optical links over longer time periods or to reestablish optical links after optical links are lost.

The optical transmitters, receivers, and transceivers described in this disclosure may find use in a large number of applications. For example, optical transmitters, receivers, or transceivers may be used in datacenters or telecommunication systems to transport information rapidly between locations, including the transport of large amounts of information over very large distances. As a particular example, optical transmitters, receivers, or transceivers may be used in optical 5G networks or other telecommunication networks that support optical communications. Optical transmitters, receivers, or transceivers may be used in consumer or commercial electronic devices, biomedical devices, or advanced computing devices to support optical-based communications with those devices. As particular examples, optical transmitters, receivers, or transceivers may be used in mobile smartphones, tablet computers, and gaming controllers (such as gaming controllers from SAMSUNG, APPLE, NINTENDO, MICROSOFT, or SONY). Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting PIC-based optical phased arrays with integrated gyroscopic sensors, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2A:
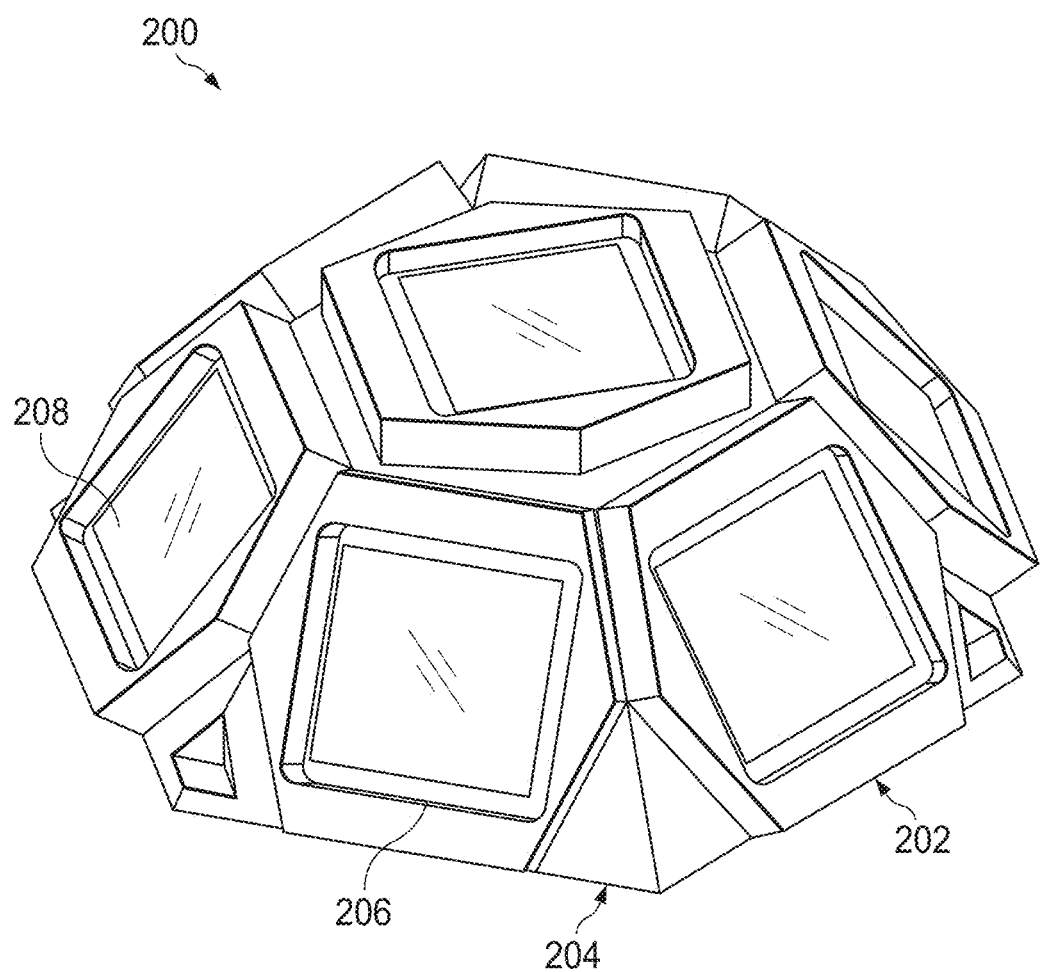
FIGS. 2A and 2B illustrate a more specific example of an optical node and system supporting PIC-based optical phased arrays with integrated gyroscopic sensors according to this disclosure.
Figure 2B:
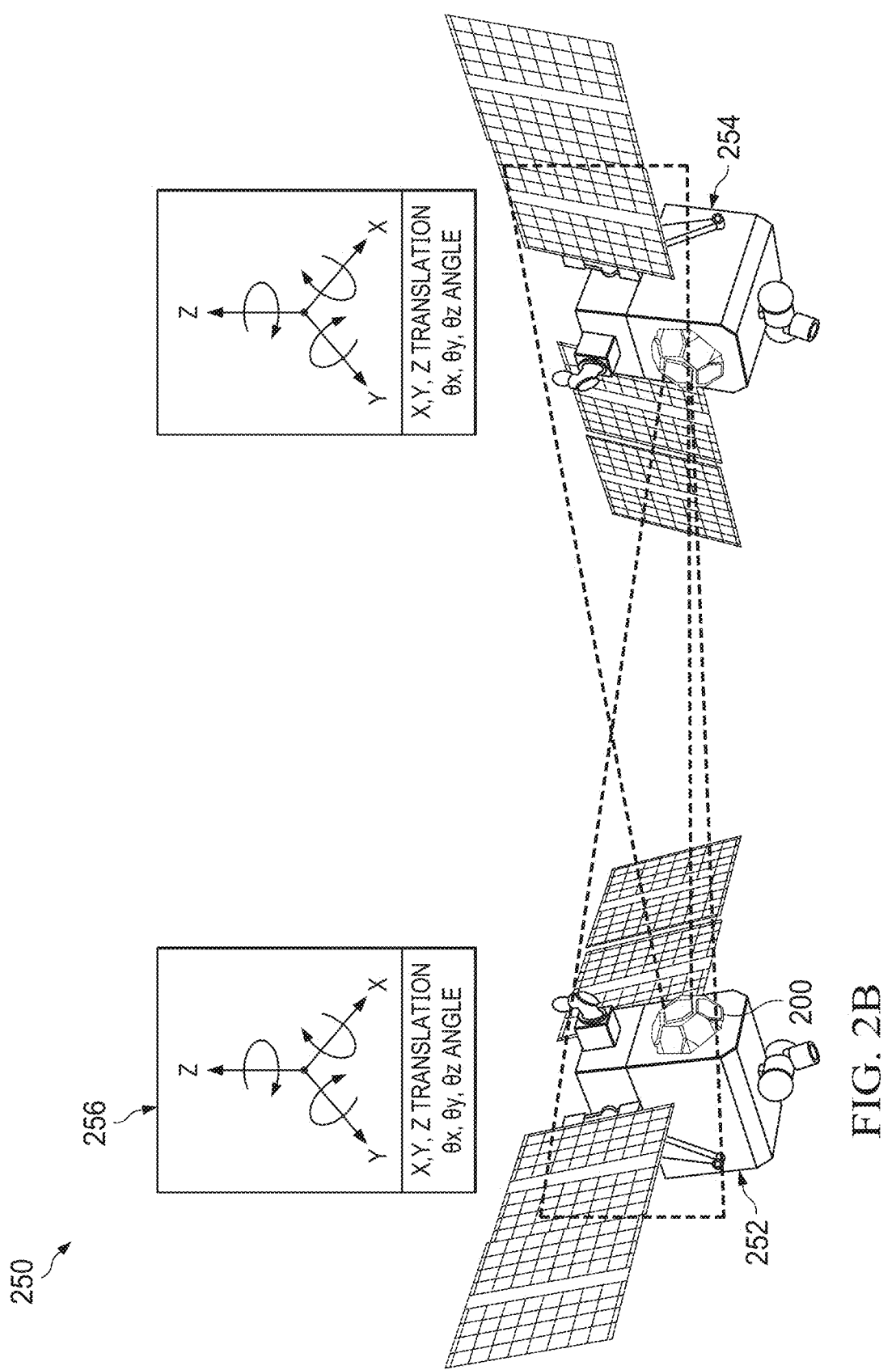

FIGS. 2A and 2B illustrate a more specific example of an optical node 200 and system 250 supporting PIC-based optical phased arrays with integrated gyroscopic sensors according to this disclosure. For example, the optical node 200 may represent a portion of specific embodiments of the nodes 102 and 104, and the system 250 may represent a specific embodiment of the system 100.

As shown in FIG. 2A, the optical node 200 includes a housing 202, which can be used to encase and protect other components supporting PIC-based communications or other optical interactions. The housing 202 may be formed from any suitable material(s), such as one or more metals, and in any suitable manner. The housing 202 may also have any suitable size, shape, and dimensions. In this example, the housing 202 can be secured to a support structure 204, which represents any suitable structure on or to which the housing 202 can be secured. The housing 202 also defines at least one aperture 206 through which outgoing or incoming optical signals, such as the signals 108 and 114, may pass. In this particular example, the housing 202 supports an arrangement of seven apertures 206, which includes one aperture surrounded by six other apertures. Note, however, that the housing 202 may define any number of apertures, including a single aperture or one or more pairs of apertures (where each pair includes one aperture for transmission and one aperture for reception).

At least one optical transmitter, optical receiver, or optical transceiver 208 is positioned within the housing 202 and communicates or otherwise interacts optically via the at least one aperture 206. In this example, there are seven optical transmitters, receivers, or transceivers 208, including one optical transmitter, receiver, or transceiver surrounded by six other optical transmitters, receivers, or transceivers. This arrangement can provide an approximately semi-hemispherical coverage by the optical node 200. Depending on the implementation, each optical transmitter, receiver, or transceiver 208 may represent a transmitter, a receiver, or a transceiver, and different instances of the optical transmitters, receivers, or transceivers 208 may represent the same type of component or different types of components. In general, one or more optical transmitters, optical receivers, or optical transceivers may be used in the optical node 200.

As shown in FIG. 2B, the system 250 includes multiple satellites 252 and 254, which may be said to form at least part of a constellation. Each satellite 252 and 254 includes one or more instances of the optical node 200, which allow the satellites 252 and 254 to communicate over suitable optical links. Each optical link may extend between two satellites or between a satellite and another device, such as a ground- or air-based device. As can be seen here, each satellite 252 and 254 may be capable of moving along and rotating about three orthogonal axes as defined by a coordinate system 256 (such as a Cartesian coordinate system). As a result, it is possible for the satellites 252 and 254 to move with respect to one another, which can create misalignment problems between the satellites 252 and 254 without correction. As described below, photonic integrated circuits forming the optical transmitters, optical receivers, or optical transceivers 208 in the optical nodes 200 may include integrated gyroscopic sensors and, along with star trackers or other tracking systems, be used to identify precision information regarding orientation changes or other movements of the associated satellites 252 and 254. This information can be used to identify and compensate for movements of the satellites 252 and 254 with respect to one another, thereby helping to reduce or avoid misalignment problems.

Figure 3A:
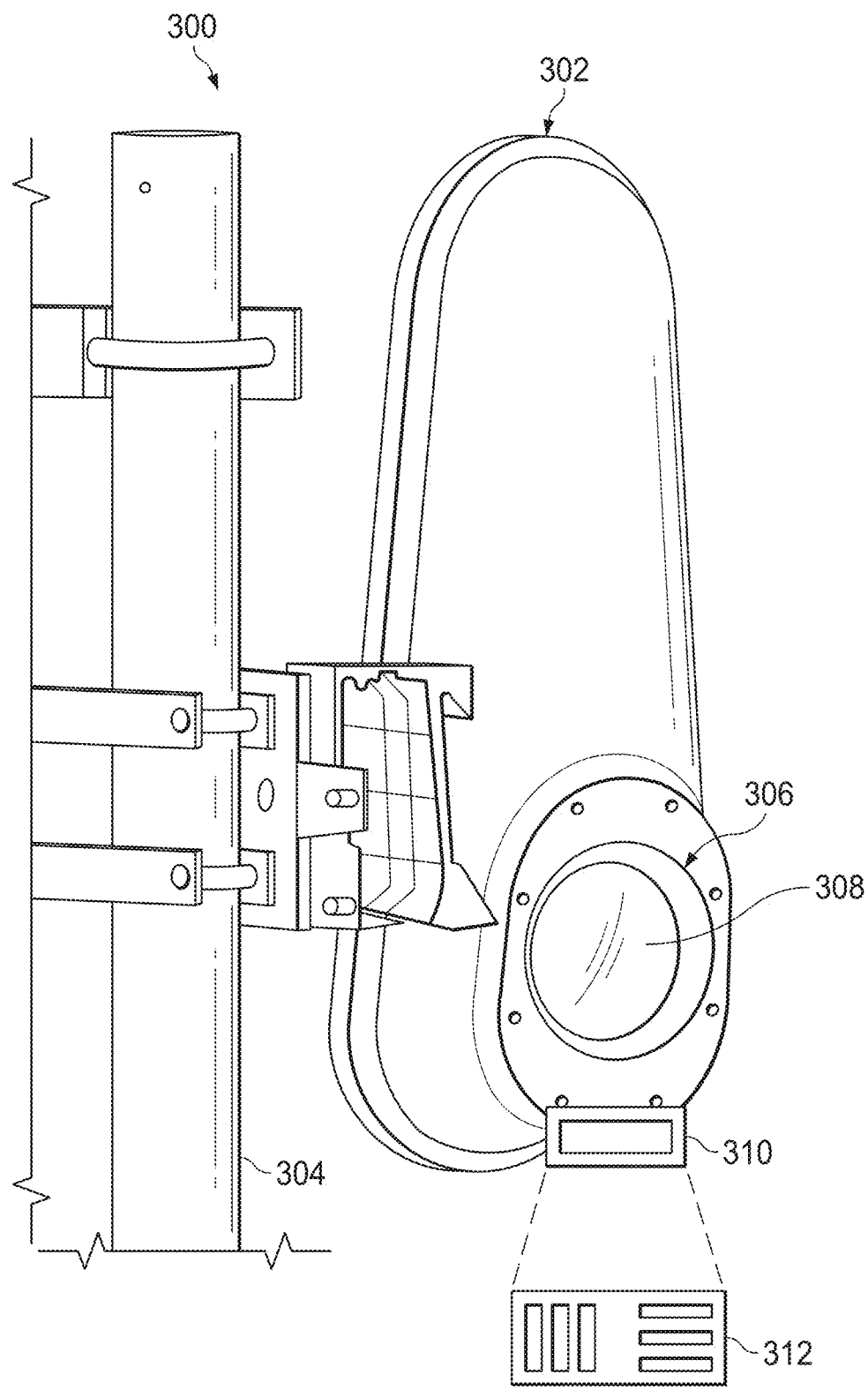
FIGS. 3A and 3B illustrate another more specific example of an optical node and system supporting PIC-based optical phased arrays with integrated gyroscopic sensors according to this disclosure.
Figure 3B:
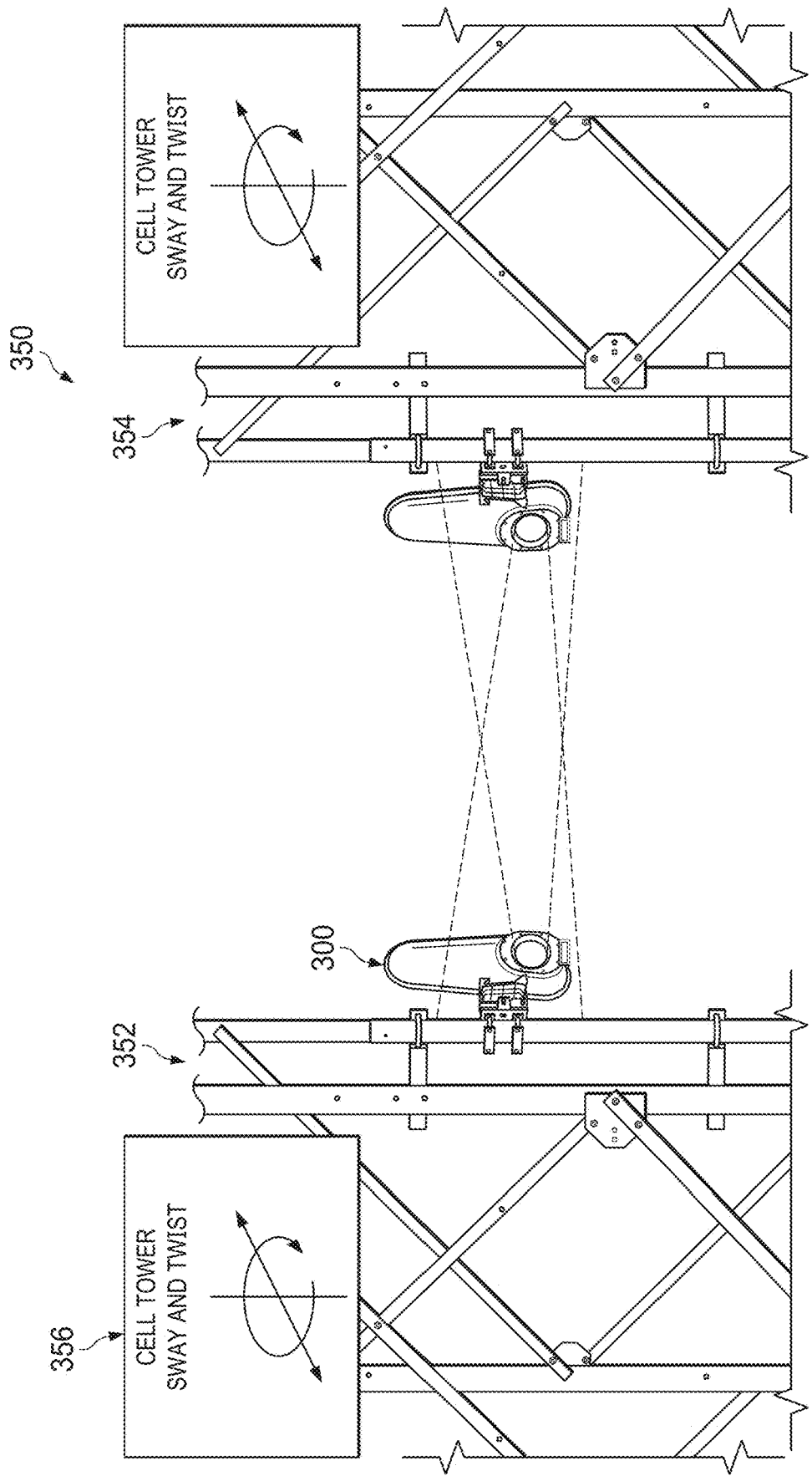

FIGS. 3A and 3B illustrate another more specific example of an optical node 300 and system 350 supporting PIC-based optical phased arrays with integrated gyroscopic sensors according to this disclosure. For example, the optical node 300 may represent a portion of specific embodiments of the nodes 102 and 104, and the system 350 may represent a specific embodiment of the system 100.

As shown in FIG. 3A, the optical node 300 includes a housing 302, which can be used to encase and protect other components supporting PIC-based communications or other optical interactions. The housing 302 may be formed from any suitable material(s), such as one or more metals, and in any suitable manner. The housing 302 may also have any suitable size, shape, and dimensions. In this example, the housing 302 can be secured to a support structure 304, which represents any suitable structure on or to which the housing 302 can be secured. The housing 302 also defines at least one aperture 306 through which outgoing or incoming optical signals, such as the signals 108 and 114, may pass. In this particular example, the housing 302 supports one aperture 306. Note, however, that the housing 302 may define any number of apertures, including multiple apertures or one or more pairs of apertures (where each pair includes one aperture for transmission and one aperture for reception). At least one optical transmitter, optical receiver, or optical transceiver 308 is positioned within the housing 302 and communicates or otherwise interacts optically via the at least one aperture 306. In this example, there is one optical transmitter, receiver, or transceiver 308. However, in general, one or more optical transmitters, optical receivers, or optical transceivers may be used in the optical node 300.

The optical node 300 may also include or otherwise be associated with an imaging sensor 310 (such as a digital camera) that is used to capture images of a ground-based illumination optical reference light source 312. The reference light source 312 may be placed directly under the optical node 300. The reference light source 312 can include one or more light emitting diodes (LEDs) or other light sources arranged in a desired manner or otherwise configured to form a desired pattern of illumination, such as a pattern having multiple horizontal lines and multiple vertical lines. The imaging sensor 310 associated with the optical node 300 can be used to capture images of the associated reference light source 312. The ability to image the ground-based reference or other reference can help to generate precision information regarding orientation changes or other movements of the optical node 300 relative to the reference, which allows for the identification of the drift of the gyroscopic sensor in the optical node 300 from a reference position. The reference light source 312 may include one or more LEDs or other light sources operating in any suitable spectrum or spectra, such as the visible spectrum or the near-infrared spectrum. Also, the light source(s) in the reference light source 312 may be temporally modulated or otherwise modulated in order to decrease interference effects, such as interference associated with background or ambient lighting.

As shown in FIG. 3B, the system 350 includes multiple cell towers 352 and 354. Each cell tower 352 and 354 includes one or more instances of the optical node 300, which allow the cell towers 352 and 354 to communicate over one or more optical links. As can be seen here, each cell tower 352 and 354 may be capable of twisting about a vertical axis and swaying (moving back and forth) along a horizontal axis as defined by a coordinate system 356. Note that the specific axis associated with the sway here can vary based on, for instance, the direction of the wind. As a result, it is possible for the cell towers 352 and 354 to move with respect to one another, which can create misalignment problems between the cell towers 352 and 354 without correction. As described below, photonic integrated circuits forming the optical transmitters, optical receivers, or optical transceivers 308 in the optical nodes 300 may include integrated gyroscopic sensors and, along with tracking systems, be used to identify precision information regarding orientation changes or other movements of the associated cell towers 352 and 354. This information can be used to identify and compensate for movements of the cell towers 352 and 354 with respect to one another, thereby helping to reduce or avoid misalignment problems.

Although FIGS. 2A through 3B illustrate two more specific examples of optical nodes 200, 300 and two more specific examples of systems 250, 350 supporting PIC-based optical phased arrays with integrated gyroscopic sensors, various changes may be made to FIGS. 2A through 3B. For example, each optical node 200 or 300 may include any suitable number of optical transmitters, optical receivers, or optical transceivers 208, 308 in any suitable arrangement to support communications or other interactions with one or more external components. Also, PIC-based communications or other interactions may be used in or by a wide range of devices and are not limited to the specific nodes 200, 300 and the specific systems 250, 350 shown here. In addition, any other suitable components may be used with the optical nodes 200, 300 or systems 250, 350 to support any other desired functions of the nodes 200, 300 or systems 250, 350. For instance, the optical nodes 200, 300, satellites 252, 254, or cell towers 352, 354 may include components that support the generation and transmission or the reception and processing of beacon signals. Beacon signals may be used to help identify where one optical node, satellite, or cell tower is located or where other optical nodes, satellites, or cell towers are located, which can facilitate optical transmissions or receptions in desired directions.

Figure 4:
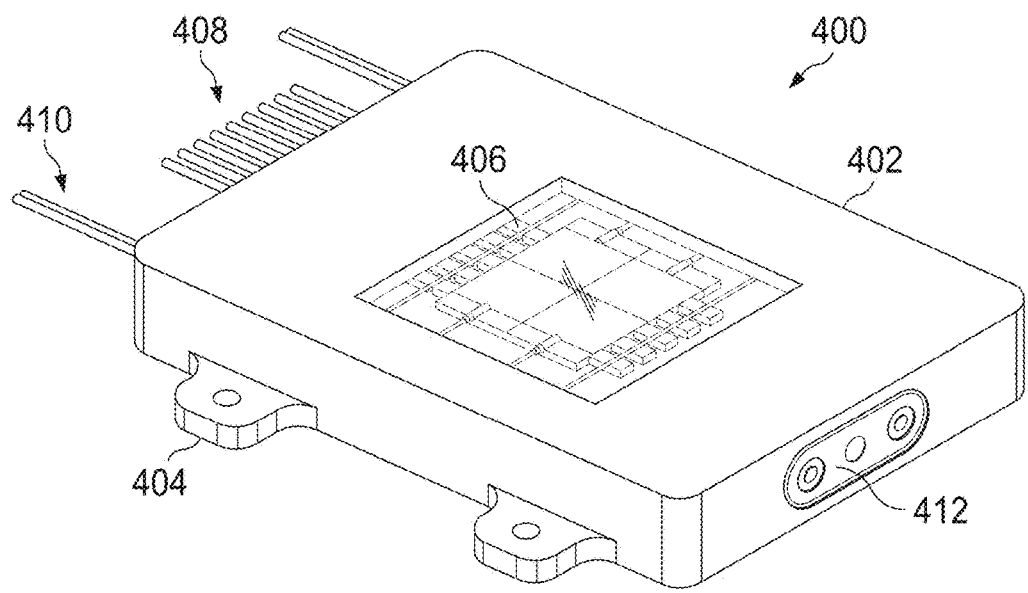
FIGS. 4 through 6 illustrate an example photonic integrated circuit-based optical device supporting a PIC-based optical phased array with an integrated gyroscopic sensor according to this disclosure.
Figure 5:
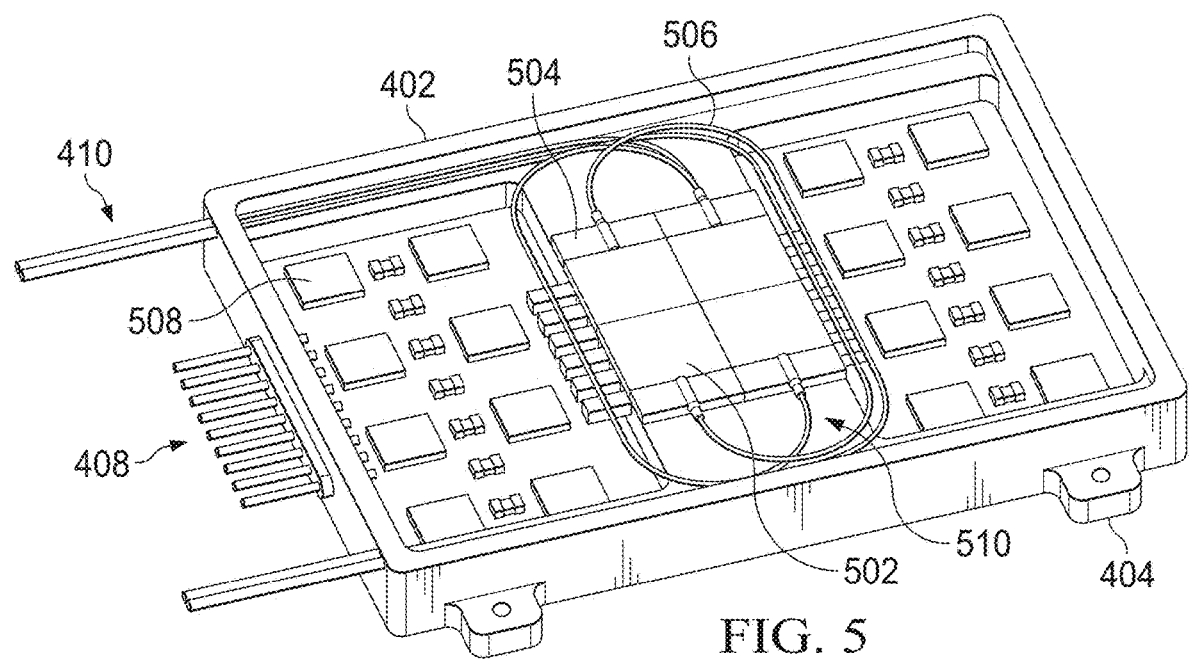
Figure 6:
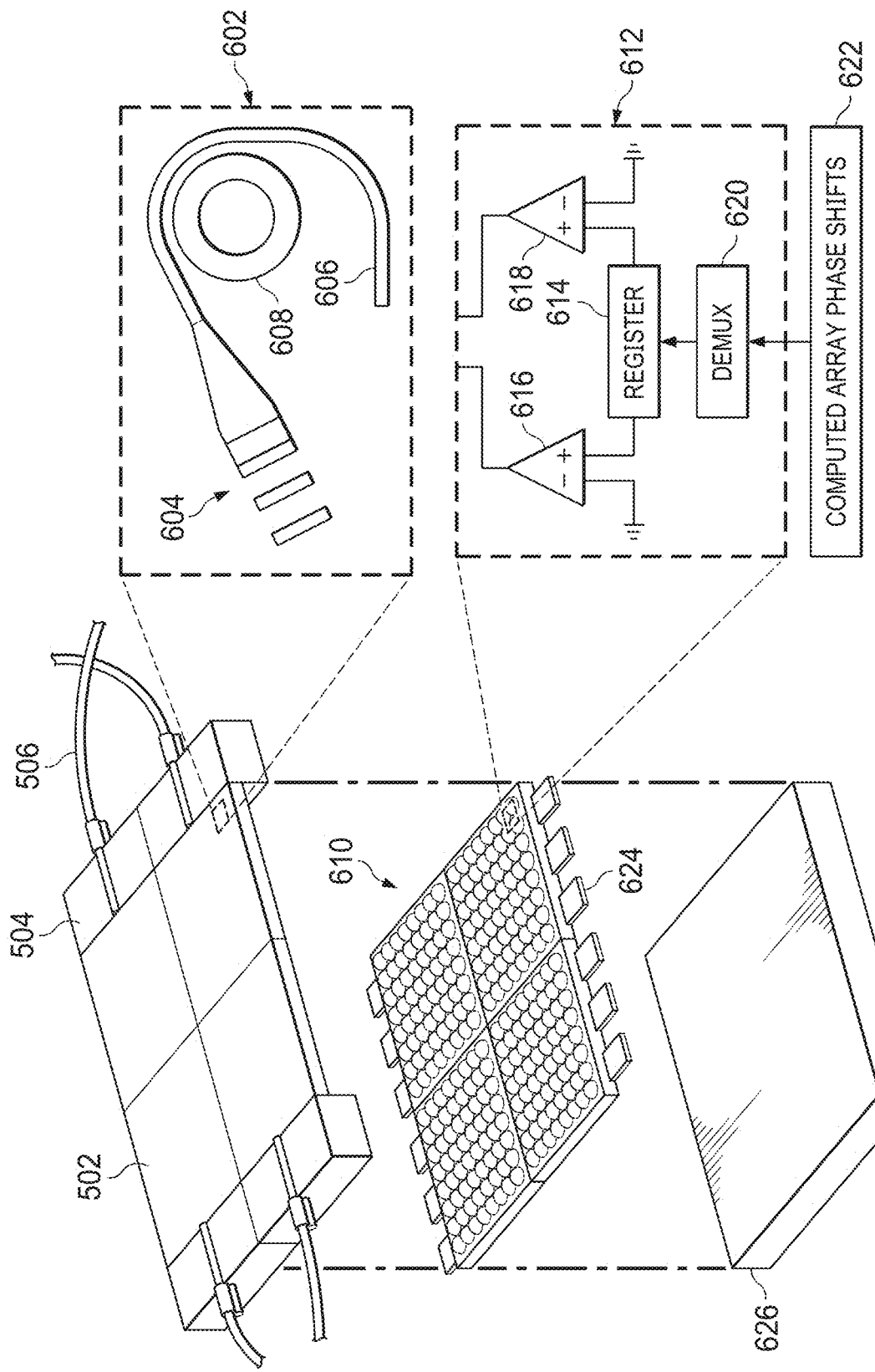

FIGS. 4 through 6 illustrate an example photonic integrated circuit-based optical device 400 supporting a PIC-based optical phased array with an integrated gyroscopic sensor according to this disclosure. For ease of explanation, the optical device 400 may be described as being used to implement each optical transmitter 106 and 112, optical receiver 110 and 116, or optical transceiver 118 and 120 in FIG. 1, each optical transmitter, optical receiver, or optical transceiver 208 in FIGS. 2A and 2B, or each optical transmitter, optical receiver, or optical transceiver 308 in FIGS. 3A and 3B. However, the optical device 400 may be used in any other suitable device and in any other suitable system.

As shown in FIG. 4, the optical device 400 includes a package 402, which surrounds and protects electronic and optical components of an optical transmitter, optical receiver, or optical transceiver. For example, the package 402 may encase and form a hermetic seal around the electronic and optical components. The package 402 may be formed from any suitable material(s), such as one or more metals, and in any suitable manner. In some embodiments, the package 402 is formed using a nickel-cobalt or nickel-iron alloy (such as KOVAR) or other material that has a coefficient of thermal expansion closely matched to that of borosilicate or other glass. The package 402 may also have any suitable size, shape, and dimensions. In some cases, the package 402 may be formed in multiple parts that can be bonded, sealed, or otherwise coupled together to enclose the electronic and optical components. For instance, the package 402 may be formed using a larger lower portion and an upper cover such that the electronic and optical components can be inserted into the lower portion and the upper cover can be connected to the lower portion. Also, in some cases, the package 402 may include flanges 404 that support mounting of the package 402 to a larger structure. However, the package 402 may have any other suitable form.

The package 402 includes an optical window 406, which is substantially or completely transparent optically (at least with respect to the optical signals being transmitted from or received by the optical device 400). The optical window 406 may be formed from any suitable material(s), such as borosilicate glass or other glass, and in any suitable manner. The optical window 406 may also have any suitable size, shape, and dimensions. In some cases, the optical window 406 may also function as a bandpass or other optical filter that filters the wavelength(s) of the optical signals being transmitted from or received by the optical device 400.

The package 402 may also include one or more electrical feedthroughs 408, which represent one or more electrical connections that can be used to transport one or more electrical signals between the interior and the exterior of the package 402. The one or more electrical signals may be used here for any suitable purposes, such as to control one or more operations of the optical device 400. As a particular example, the one or more electrical signals may be used for controlling the phases of antenna elements of a photonic integrated circuit in the optical device 400. The package 402 may further include one or more fiber inputs/outputs 410, which can be used to provide one or more input signals to the optical device 400 or receive one or more output signals from the optical device 400. For instance, the one or more input signals may carry information to be transmitted from the optical device 400, and the one or more output signals may carry information received at and recovered by the optical device 400. In this example, there are two fiber inputs/outputs 410, although the optical device 400 may include a single fiber input/output 410 or more than two fiber inputs/outputs 410. Note, however, that no fiber inputs/outputs 410 may be needed if all optical generation and processing occurs using components within the package 402, in which case the electrical feedthroughs 408 may be used to transport information or other signals to or from the optical device 400.

In addition, the optical device 400 may include at least one imaging sensor 412, such as a CMOS imaging device or other digital imaging device. The at least one imaging sensor 412 may be used to capture images of scenes, such as images of star fields or images af a ground-based illumination optical reference light source 312. The captured images may be used by a tracking system to identify the displacement or other movements of the optical device 400 relative to a reference position. This information can be used to compensate for gyroscopic drift and to facilitate precise determinations of how the optical device 400 has moved relative to another device. Note that while the at least one imaging sensor 412 is shown here as being attached to or positioned within the package 402, the at least one imaging sensor 412 may be located at any other suitable position(s).

As shown in FIG. 5, a photonic integrated circuit 502 is positioned within the package 402, namely at a location where the photonic integrated circuit 502 can transmit or receive optical signals through the optical window 406. As described below, the photonic integrated circuit 502 may include an integrated gyroscopic sensor that can be used to help reduce or prevent misalignment issues involving the optical device 400. The photonic integrated circuit 502 may be formed from any suitable material(s), such as silicon, indium phosphide, or gallium arsenide, and in any suitable manner. The photonic integrated circuit 502 may also have any suitable size, shape, and dimensions. As a particular example, the photonic integrated circuit 502 may be square and have an edge length of about 40 mm, although any other suitable sizes and shapes may be used here.

Fiber mounts 504 are used to couple to optical fibers 506 at locations where the optical fibers 506 can provide optical signals to or receive optical signals from the photonic integrated circuit 502. For example, the optical fibers 506 may provide optical signals from a source laser to the photonic integrated circuit 502 for use during outgoing transmissions. The optical fibers 506 may also or alternatively provide optical signals received by the photonic integrated circuit 502 to a receiver for processing. Each fiber mount 504 includes any suitable structure configured to be coupled to an optical fiber 506. Each optical fiber 506 represents any suitable length of an optical medium configured to transport optical signals to or from a photonic integrated circuit 502. Note that while four fiber mounts 504 and four optical fibers 506 are shown here, the optical device 400 may include, one, two, three, or more than four fiber mounts 504 and optical fibers 506. Also note that no fiber mounts 504 and optical fibers 506 may be needed if all optical generation and processing occurs using components of the photonic integrated circuit 502.

An electronic control board 508 includes electronic components, such as one or more integrated circuit chips and other components, that control the operation of the photonic integrated circuit 502. For example, the electronic control board 508 may include one or more components that calculate desired phases or phase corrections for optical signals to be transmitted by antenna elements of the photonic integrated circuit 502, which allows the electronic control board 508 to control functions such as beam forming or beam steering operations. Also or alternatively, the electronic control board 508 may include one or more components that calculate desired phases or phase corrections to be applied to optical signals received by antenna elements of the photonic integrated circuit 502, which allows the electronic control board 508 to control functions such as wavefront reconstruction operations. The electronic control board 508 includes any suitable components configured to perform one or more desired functions related to a photonic integrated circuit 502.

Spacers 510 may be positioned on opposite sides of the photonic integrated circuit 502 and used to help separate the optical fibers 506 from the electronic control board 508. The spacers 510 may be formed from any suitable material(s), such as ceramic, and in any suitable manner.

As shown in FIG. 6, the photonic integrated circuit 502 includes a number of unit cells 602. Each unit cell 602 is configured to transmit or receive one or more optical signals. The photonic integrated circuit 502 can include any suitable number of unit cells 602, possibly up to and including a very large number of unit cells 602. In some embodiments, for example, the photonic integrated circuit 502 may include an array of unit cells 602 up to a size of 1024×1024 (meaning over one million unit cells 602), 2048×2048 (meaning over four million unit cells 602), or even larger. The size of the photonic integrated circuit 502 is based, at least in part, on the number and size of the unit cells 602. As noted above, in some cases, the photonic integrated circuit 502 may be square with edges of about 40 mm in length. However, the photonic integrated circuit 502 may be scaled to smaller or larger sizes (such as about 2.5 cm by about 2.5 cm), while further scaling up to even larger sizes (such as about 20 cm by about 20 cm or about 30 cm by about 30 cm) may be possible depending on fabrication capabilities.

Each unit cell 602 includes an antenna element 604, which is configured to physically transmit or receive one or more optical signals to or from one or more external devices or systems. For example, each antenna element 604 may represent a nanophotonic antenna or other antenna element that transmits or receives at least one optical signal, along with one or more lenses or other optical devices configured to focus or otherwise process the at least one optical signal. Depending on the implementation, the antenna element 604 may sometimes be referred to as an emitter in a transmitting array or a receiver in a receiving array. Each antenna element 604 may have any suitable size, shape, and dimensions. In some cases, the emitting/receiving surface of the antenna element 604 may be about 3 µm to about 4 µm in diameter. Note that while a single antenna element 604 is shown here, each unit cell 602 may include multiple antenna elements 604, such as when two antenna elements 604 are arranged orthogonally or substantially orthogonally with respect to one another. This arrangement may, for instance, provide the unit cells 602 with multi-polarization sensitivity.

Each antenna element 604 here is coupled to a signal pathway 606. The signal pathways 606 are configured to transport optical signals to or from the antenna elements 604. For example, the signal pathways 606 can provide optical signals to the antenna elements 604 for transmission. Also or alternatively, the signal pathways 606 can provide optical signals received by the antenna elements 604 to optical detectors or other components for processing. Each signal pathway 606 includes any suitable structure configured to transport optical signals, such as an optical waveguide. Note that only a portion of the signal pathway 606 may be shown in FIG. 6, since a signal pathway 606 can vary based on how the associated unit cell 602 is designed and positioned within the photonic integrated circuit 502.

Modulators 608 are provided in the unit cells 602 for the antenna elements 604 and are used (among other things) to control the phases of optical signals transmitted or received by the associated antenna elements 604. For example, when the antenna elements 604 are transmitting, the modulators 608 can be used to achieve desired phases of outgoing optical signals in order to support functions such as beam forming or beam steering. When the antenna elements 604 are receiving, the modulators 608 can be used to apply phase control to the incoming wavefront of received optical signals in order to support functions such as decomposing or reconstructing the wavefront. Each modulator 608 includes any suitable structure configured to modulate the phase of an optical signal, such as a resonant micro-ring modulator or a PN junction micro-ring modulator. In some cases, each modulator 608 may be a resonant micro-ring modulator that is about 5.5 µm in diameter, although modulators of other sizes may be used here.

The modulators 608 of the photonic integrated circuit 502 are electrically coupled to a digital read in integrated circuit (DRIIC) layer 610, which is used to provide electrical signals to the modulators 608 in order to control the phase modulations applied to the incoming or outgoing optical signals by the modulators 608. In some embodiments, the photonic integrated circuit 502 can be "flip-chip" bonded to the DRIIC layer 610, although other mechanisms for electrically coupling the photonic integrated circuit 502 and the DRIIC layer 610 may be used.

The DRIIC layer 610 in this example includes a number of individual DRIIC cells 612, where each DRIIC cell 612 may be associated with (and in some cases may have about the same size as) a corresponding one of the unit cells 602. The DRIIC cells 612 control the phase modulations that are applied by the modulators 608 of the unit cells 602. The DRIIC cells 612 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 612 may operate to convert digital values into suitable DC analog voltages between 0 V and 3.3 V, although other voltages (including negative voltages) can be supported depending on the implementation.

In this example, each DRIIC cell 612 may include a register 614 configured to store values associated with different phase shifts to be applied by the modulator 608 of its corresponding unit cell 602. To provide a desired phase shift, appropriate values from the register 614 are selected and provided to two amplifiers 616 and 618, which generate output voltages that are provided to the associated modulator 608. The output voltages control the phase shift provided by the associated modulator 608. Different values from the register 614 are provided to the amplifiers 616 and 618 over time so that different output voltages are applied to the associated modulator 608. In this way, each DRIIC cell 612 can cause its associated modulator 608 to provide different phase shifts over time, thereby supporting various functions like beam forming, beam steering, or wavefront reconstruction.

In some embodiments, each DRIIC cell 612 may be used to provide a relatively small number of different output voltages to its associated modulator 608. For example, in some cases, each DRIIC cell 612 can cause the associated modulator 608 to provide four different phase shifts. However, other numbers of output voltages and associated phase shifts may be supported here, such as when up to 256 different phase shifts or more are supported. Also, the output voltages provided to the modulators 608 by different DRIIC cells 612 may be different even when those modulators 608 are providing the same phase shift, which may be due to factors such as manufacturing tolerances. The actual output voltages used for each modulator 608 can be selected during calibration so that appropriate values may be stored in each register 614.

In this example, the actual values in each DRIIC cell 612 that are provided to the amplifiers 616 and 618 by the register 614 overtime can be controlled using a demultiplexer 620. Each demultiplexer 620 receives a stream of computed array phase shifts 622 and outputs the phase shifts 622 that are to be applied by that DRIIC cell's associated modulator 608. The phase shifts 622 output by the demultiplexer 620 can identify or otherwise to be used to select specific values from the register 614 to be output to the amplifiers 616 and 618. The computed array phase shifts 622 here may be provided by one or more external components, such as the electronic control board 508 or an external component communicating with the electronic control board 508. While not shown here, array-level deserialization circuitry may be used to separate and fan out high-speed digital signals to the array of individual DRIIC cells 612.

Each register 614 includes any suitable structure configured to store and retrieve values. Each amplifier 616 and 618 includes any suitable structure configured to generate a control voltage or other control signal based on an input. Each demultiplexer 620 includes any suitable structure configured to select and output values.

Note that this represents one example way in which the modulators 608 of the unit cells 602 can be controlled. In general, any suitable technique may be used to provide suitable control voltages or other control signals to the modulators 608 for use in controlling the phase shifts provided by the modulators 608. For example, the approach shown in FIG. 6 allows values that are applied to the amplifiers 616 and 618 to be stored in the register 614 and retrieved as needed, which allows an external component to provide indicators of the desired values to be retrieved to the DRIIC cells 612. In other embodiments, an external component may provide digital values that are converted by different circuitry into analog values.

Various electrical connections 624 are provided in or with the DRIIC layer 610. The electrical connections 624 may be used to provide electrical signals to the DRIIC cells 612, such as when the electrical connections 624 are used to receive high-speed digital signals containing the computed array phase shifts 622 for the DRIIC cells 612. Any suitable number and arrangement of electrical connections 624 may be used here.

A thermal spreader 626 can be positioned in thermal contact with the DRIIC layer 610. The thermal spreader 626 helps to provide a more consistent temperature across the DRIIC layer 610 and the photonic integrated circuit 502 by functioning as a heat sink that removes thermal energy from the DRIIC layer 610 and the photonic integrated circuit 502. At times, the thermal spreader 626 may also provide thermal energy to the DRIIC layer 610, which helps to heat the DRIIC layer 610 and the photonic integrated circuit 502. Thermal energy that is generated by the DRIIC layer 610 or injected into the photonic integrated circuit 502 may vary over time, and the thermal spreader 626 can help to maintain a substantially constant temperature of the photonic integrated circuit 502. The thermal spreader 626 may be formed from any suitable material(s), such as one or more metals like copper, and in any suitable manner. The thermal spreader 626 may also have any suitable size, shape, and dimensions.

Although FIGS. 4 through 6 illustrate one example of a photonic integrated circuit-based optical device 400 supporting a PIC-based optical phased array with an integrated gyroscopic sensor, various changes may be made to FIGS. 4 through 6. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

Figure 7:
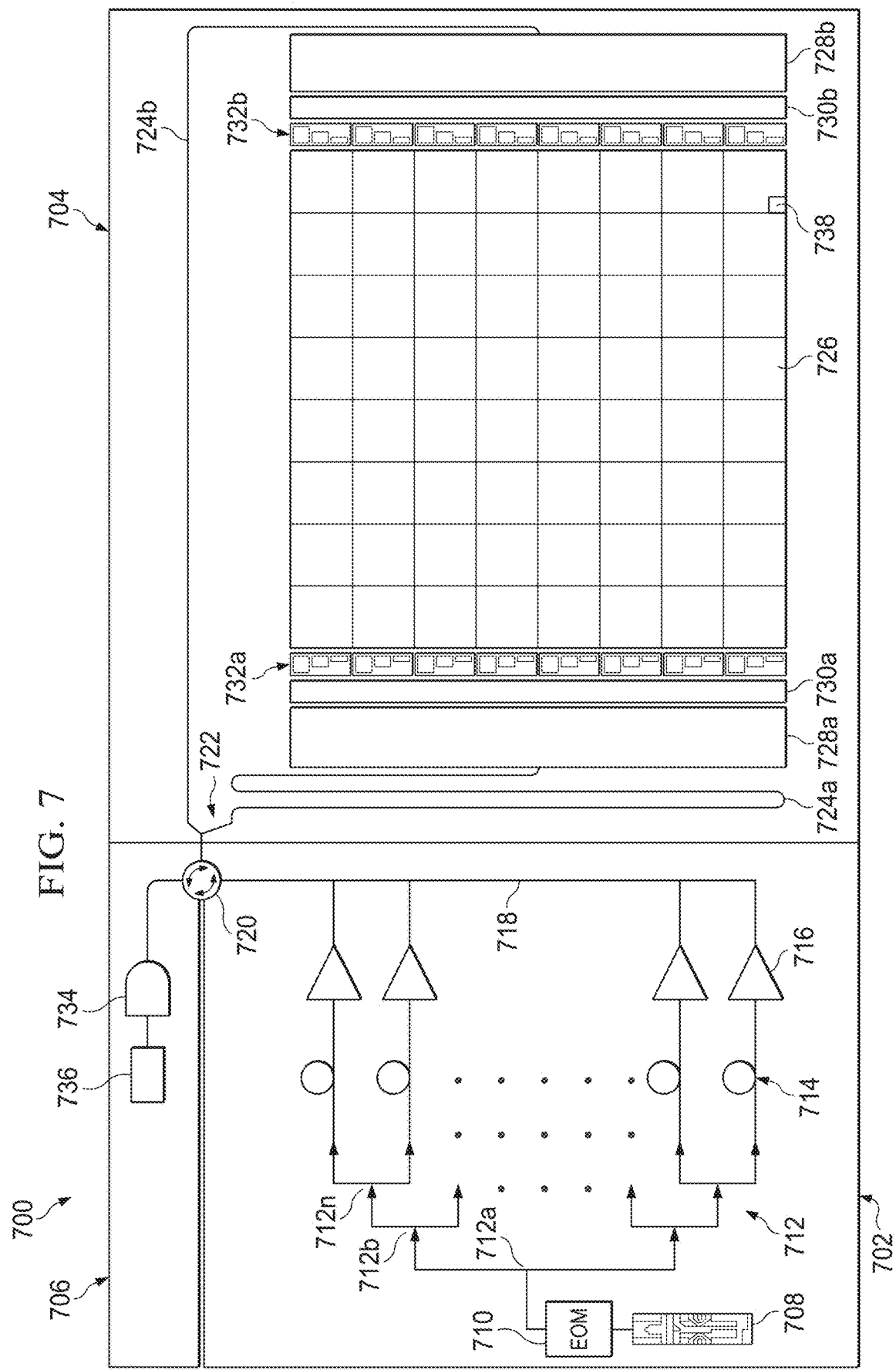
FIGS. 7 and 8 illustrate an example architecture of a photonic integrated circuit supporting a PIC-based optical phased array with an integrated gyroscopic sensor according to this disclosure.
Figure 8:
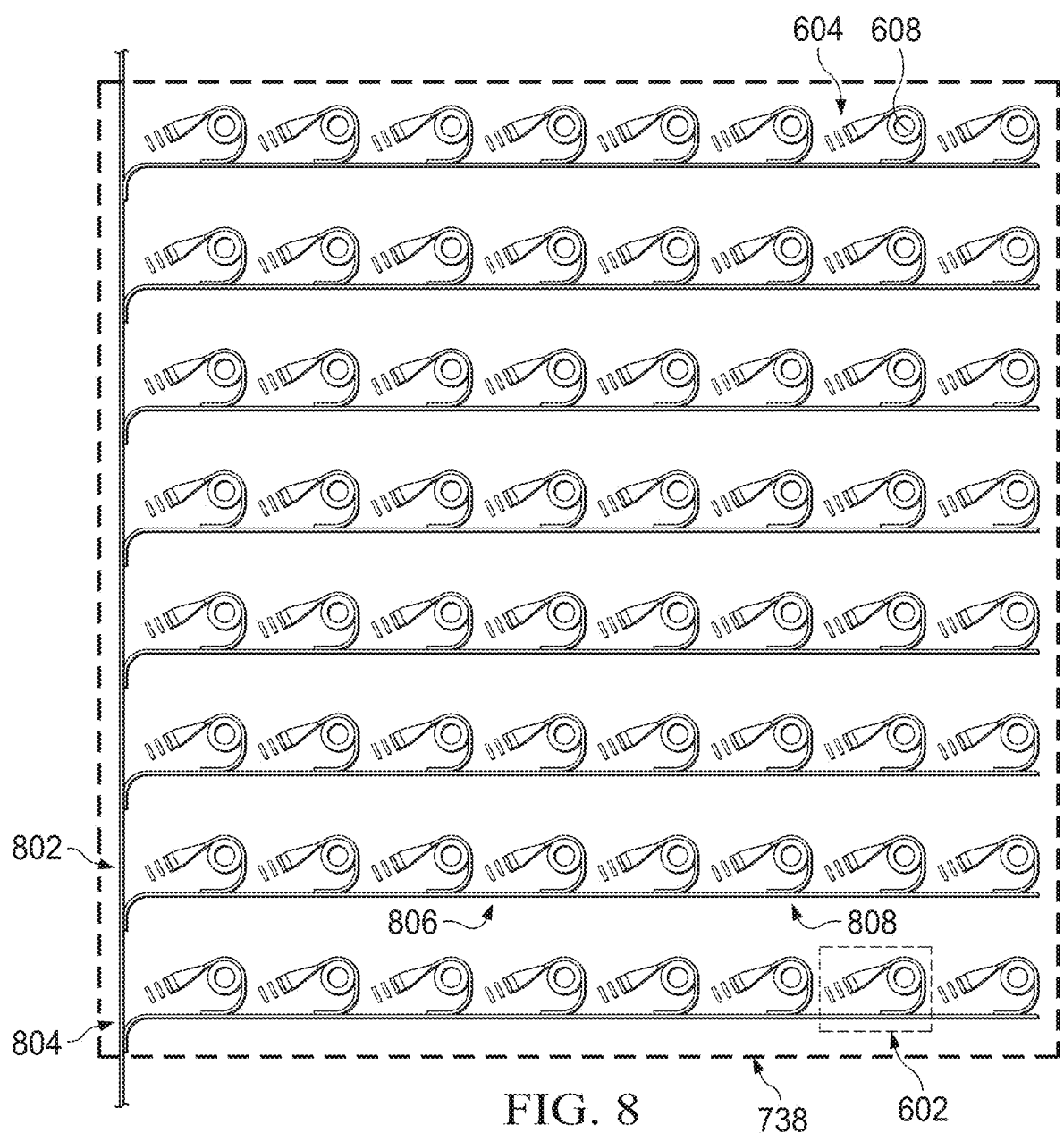

FIGS. 7 and 8 illustrate an example architecture 700 of a photonic integrated circuit supporting a PIC-based optical phased array with an integrated gyroscopic sensor according to this disclosure. For example, the architecture 700 may represent an example implementation of the photonic integrated circuit-based optical device 400 of FIGS. 4 through 6. In particular, the example architecture 700 of FIGS. 7 and 8 may be implemented within or using the photonic integrated circuit 502 of the optical device 400.

As shown in FIG. 7, the architecture 700 includes a source laser 702, an OPA 704, and a receiver 706. The source laser 702 generally operates to produce optical signals that are used by the OPA 704 to transmit outgoing optical signals. The OPA 704 generally operates to transmit outgoing optical signals and to receive incoming optical signals. The receiver 706 generally operates to process the incoming optical signals. These components allow the architecture 700 to support optical transceiver functionality, although some components may be removed from the architecture 700 if only optical transmitter or only optical receiver functionality is desired.

In this example, the source laser 702 includes a laser 708, which operates to produce a lower-power input beam. The laser 708 includes any suitable structure configured to generate a laser output, such as a distributed feedback (DFB) diode laser. The lower-power input beam can have any suitable power level based on the laser 708 being used for a specific application. In some cases, the lower-power input beam may have a power level of one or several tens of milliwatts to one or several hundreds of milliwatts, although these values are for illustration only. Also, in some cases, the laser 708 may be fabricated using at least one group III element and at least one group V element and may therefore be referred to as a "III-V" laser. However, any other suitable materials may be used to fabricate the laser 708. The lower-power input beam is provided to an electro-optic modulator (EOM) 710, which can modulate the lower-power input beam based on an input electrical signal. The EOM 710 can provide any suitable modulation here, such as amplitude or phase modulation. In some embodiments, the EOM 710 is implemented as a Mach-Zehnder modulator (MZM).

A splitter 712 generally operates to split the modulated input beam into optical signals traveling over different optical pathways. In this example, the splitter 712 includes a hierarchical arrangement of splitters 712a-712n, each of which can receive and split an optical input in order to produce two optical outputs of substantially equal power. Note that the number of splitters 712a-712n and the number of hierarchical levels of splitters 712a-712n can vary based on the number of optical signals to be produced. For example, there may be five levels of splitters if thirty-two optical signals are desired or six levels of splitters if sixty-four optical signals are desired. Note, however, that other numbers of optical signals may be produced using any suitable number of splitters. Also note that any other suitable structure(s) may be used to split an optical signal, such as a multi-mode interferometer or a coupler tree.

The optical signals from the splitter 712 can be phase shifted using an array of phase shifters 714, where each phase shifter 714 can shift the phase of one of the optical signals. Each phase shifter 714 includes any suitable structure configured to phase-shift an optical signal, such as a resonant micro-ring modulator. In some embodiments, the resonant micro-ring modulators may be silicon-based and have diameters of about 5 microns to about 6 microns, although other implementations of the phase shifters 714 may be used.

The phase-shifted optical signals are provided to an array of semiconductor optical amplifiers (SOAs) 716. Each semiconductor optical amplifier 716 amplifies one of the phase-shifted optical signals to produce a higher-power version of that optical signal. Each semiconductor optical amplifier 716 represents any suitable semiconductor-based amplifier configured to amplify an optical signal. Each of the amplified optical signals can have any suitable power level based on the semiconductor optical amplifiers 716 being used. In some cases, the amplified optical signals may each have a power level of about three watts, although this value is for illustration only. The amplified optical signals can be combined and transported over an optical waveguide 718, which allows for source-coherent combination of the outputs from the semiconductor optical amplifiers 716 (since the amplifiers 716 can form a phase-locked array of SOAs). The combined signal is provided to a circulator 720, which provides the combined signal to the OPA 704.

In the OPA 704, the combined signal is split by a splitter 722 so that substantially equal first portions of the combined signal are provided to two waveguides 724a-724b. The waveguides 724a-724b here may have substantially the same length so that there is little or no phase difference between the first portions of the combined signal exiting the waveguides 724a-724b. In this example, the photonic integrated circuit 502 is implemented using supercells 726, where each supercell 726 includes a subset of the unit cells 602. In some embodiments, for example, each supercell 726 may include a 32×32 arrangement of unit cells 602, although other numbers and arrangements of unit cells 602 may be used in each supercell 726. In this particular example, the photonic integrated circuit 502 includes sixty-four supercells 726, although other numbers of supercells 726 may be used. Multiple supercells 726 can be driven using the same portion of the combined signal from the source laser 702, which helps to simplify phase control and other operations in the architecture 700. The ability to drive all unit cells 602 in a supercell 726 collectively allows, for instance, amplitude modulation of each supercell 726 to control the transmit power of the unit cells 602 in that supercell 726.

In order to drive the supercells 726 using the combined signal from the source laser 702, the waveguides 724a-724b provide the first portions of the combined signal to splitters 728a-728b, such as 1×8 optical splitters, which split the first portions of the combined signal into more-numerous second portions of the combined signal. Additional splitters 730a-730b, such as 8-32 splitters, split the second portions of the combined signal into even more-numerous third portions of the combined signal. This results in the creation of sixty-four optical signals, which can be used to drive the supercells 726. Note that this arrangement of 1×8 and 8×32 splitters is merely one example of how the supercells 726 in this specific photonic integrated circuit 502 may be driven. Other approaches may be used to drive a photonic integrated circuit 502, including approaches that use other numbers or arrangements of splitters. The specific approach shown in FIG. 7 is merely one example of how supercells 726 of this specific photonic integrated circuit 502 may be driven.

Time delay paths 732a-732b are provided between the splitters 730a-730b and the supercells 726 in order to compensate for different optical pathlengths to reach the different supercells 726. For example, assume that each row of supercells 726 in the photonic integrated circuit 502 is driven using four outputs from the splitter 730a and four outputs from the splitter 730b. Without compensation, different outputs from the splitters 730a-730b would reach different supercells 726 at different times, which can create undesired phase differences and reduce the throughput of the architecture 700. The time delay paths 732a-732b represent spiraled or other optical pathways that delay at least some of the outputs from the splitters 730a-730b so that the outputs from the splitters 730a-730b reach all supercells 726 at substantially the same time. For example, the time delay paths 732a-732b may delay signals to closer supercells 726 by larger amounts and delay signals to farther supercells 726 by smaller or no amounts. The optical signals that are received at the supercells 726 are used by the supercells 726 to produce outgoing optical signals.

The supercells 726 may also receive incoming optical signals, which can be transported over the waveguides 724a-724b and through the circulator 720 to the receiver 706. In this example, the receiver 706 includes at least one photodetector 734, such as at least one photodiode that converts the received incoming optical signals into electrical currents. A transimpedance amplifier 736 converts the electrical currents into electrical voltages, which can then be further processed (such as to recover information contained in the incoming optical signals).

Note that the source laser 702 and various components of the OPA 704 may be fabricated from different materials in order to allow for different optical power levels to be used in the architecture 700. For example, components of the source laser 702 may be fabricated using silicon nitride, germanium, or other materials that allow the source laser 702 to generate a relatively high-power combined beam for the OPA 704. In the OPA 704, the waveguides 724a-724b and the splitters 728a-728b may similarly be fabricated using silicon nitride or other materials that support the transport and splitting of the relatively high-power combined beam from the source laser 702. The splitters 730a-730b may be fabricated using silicon (rather than silicon nitride) or other materials that can split lower-power optical signals (since the optical energy from the source laser 702 has already been split at this point). However, the components of the architecture 700 may be fabricated from any other suitable materials. Also note that various components of the architecture 700 may or may not be fabricated using one or more common materials.

A portion 738 of one of the supercells 726 is identified in FIG. 7 and shown in greater detail in FIG. 8. As shown in FIG. 8, this portion 738 of the supercell 726 includes an 8×8 arrangement of unit cells 602, where each unit cell 602 has the same or similar structure to that shown in FIG. 6. As can be seen here, the unit cells 602 are fed using a feed path 802, where splitters 804 are positioned along the feed path 802 to split off portions of an optical signal. These portions of the optical signals are provided over feed paths 806, where splitters 808 are positioned along the feed paths 806 to further split off portions of the optical signal. Ideally, the splitters 804 and 808 are configured such that each of the unit cells 602 receives a substantially equal portion of the optical signal input to the feed path 802. In some embodiments, the feed paths 802, 806 and splitters 804, 808 may be formed from silicon, although other materials may be used here.

In FIG. 8, it can be seen that different path lengths exist between the input of the feed path 802 (located at the bottom of the feed path 802 in FIG. 8) and different unit cells 602. In this particular example, the shortest path length exists between the input of the feed path 802 and the bottom left unit cell 602, and the longest path length exists between the input of the feed path 802 and the top right unit cell 602. As with the supercells 726 themselves, without compensation, these different path lengths would cause different portions of an optical signal to reach the unit cells 602 at different times. In some cases, the phase shifts provided by the modulators 608 in the unit cells 602 can, among other things, be used to compensate for the different path lengths between the input of the feed path 802 and each unit cell 602. Also or alternatively, linear or other phase shifters may be used to compensate for the different path lengths between the input of the feed path 802 and each unit cell 602.

Note that if each supercell 726 includes a 32×32 arrangement of unit cells 602, each supercell 726 would include thirty-two rows of unit cells 602, where each row includes thirty-two unit cells 602. Thus, the portion 738 shown in FIG. 8 would be replicated sixteen times within each supercell 726. However, it is possible for the supercells 726 to each have a different number and arrangement of unit cells 602 as needed or desired.

In some embodiments, all of the components in the architecture 700 of FIG. 7 may be implemented in an integrated manner, such as when implemented using a single integrated electrical and photonic chip. As noted above, for example, different components of the architecture 700 may be fabricated using silicon and silicon nitride, which enables fabrication using standard silicon-based processes. When implemented in an integrated manner, the architecture 700 may be implemented using a single photonic integrated circuit chip, and there may be no need for components such as the fiber inputs/outputs 410, fiber mounts 504, and optical fibers 506. However, integration of the components in the architecture 700 is not necessarily required. Thus, for example, the source laser 702 may be implemented off-chip or replaced using a standard erbium-doped fiber amplifier laser or other external laser. As another example, the receiver 706 may be implemented off-chip.

Although FIGS. 7 and 8 illustrate one example of an architecture 700 of a photonic integrated circuit 502 supporting a PIC-based optical phased array with an integrated gyroscopic sensor, various changes may be made to FIGS. 7 and 8. For example, this particular embodiment logically splits the photonic integrated circuit 502 in half by using two waveguides 724a-724b, two sets of splitters 728a-728b, 730a-730b, and two sets of time delay paths 732a-732b. However, the photonic integrated circuit 502 may be logically split into other numbers of portions or not logically split. Also, various components in FIGS. 7 and 8 may be combined, further subdivided, replicated, omitted, or rearranged and additional components may be added according to particular needs.

Figure 9:
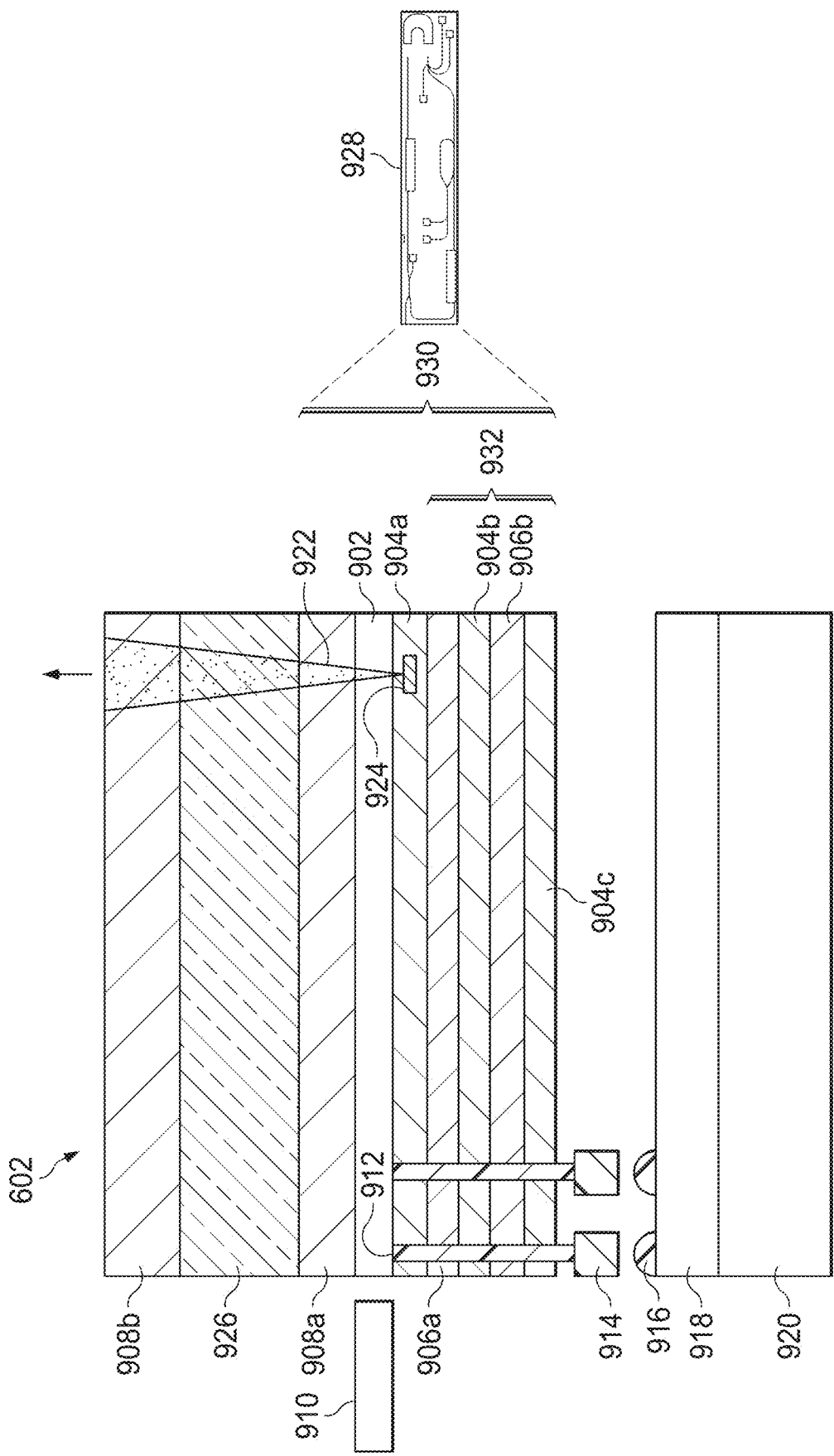
FIG. 9 illustrates an example cross-section of a unit cell in a PIC-based optical phased array with an integrated gyroscopic sensor according to this disclosure.

FIG. 9 illustrates an example cross-section of a unit cell 602 in a PIC-based optical phased array with an integrated gyroscopic sensor according to this disclosure. For ease of explanation, the unit cell 602 of FIG. 9 may be described as being used in the optical device 400 in order to at least partially implement each optical transmitter 106 and 112, optical receiver 110 and 116, or optical transceiver 118 and 120 in FIG. 1, each optical transmitter, optical receiver, or optical transceiver 208 in FIGS. 2A and 2B, or each optical transmitter, optical receiver, or optical transceiver 308 in FIGS. 3A and 3B. However, the unit cell 602 may be used in any other suitable optical device or other device and in any other suitable system.

As shown in FIG. 9, each unit cell 602 may be fabricated as a multi-layer structure that uses components in various layers to implement the desired functions of the unit cell 602. In this example, the multi-layer structure includes a photonics layer 902, which represents the layer in which various photonic functions (such as waveguides and possibly antennas) can be fabricated. The photonics layer 902 may be formed using any suitable material(s), such as silicon. The photonics layer 902 may also be formed in any suitable manner, such as by depositing material(s) on another layer and etching or otherwise processing the material(s). In addition, the photonics layer 902 may have any suitable dimensions, such as a thickness of about 220 nm.

Various layers 904a-904c and 906a-906b are positioned on one side of the photonics layer 902 and can provide electrical insulation or perform other functions. Each of the layers 904a-904c and 906a-906b may be formed using any suitable material(s). In some embodiments, each of the layers 904a-904c may be formed using silicon dioxide or other dielectric material, and each of the layers 906a-906b may be formed using silicon nitride. Each of the layers 904a-904c and 906a-906b may also be formed in any suitable manner, such as by depositing material(s) on another layer and etching or otherwise processing the material(s). In addition, each of the layers 904a-904c and 906a-906b may have any suitable dimensions. In some embodiments, the layer 904a may have a thickness of about 100 nm to about 2000 nm, each of the layers 904b-904c may have a thickness of about 100 nm, and each of the layers 906a-906b may have a thickness of about 220 nm.

Various layers 908a-908b are also positioned on the opposite side of the photonics layer 902 and can provide electrical insulation or perform other functions. Each of the layers 908a-908b may be formed using any suitable material(s). In some embodiments, each of the layers 908a-908b may be formed using silicon dioxide or other dielectric material. As a particular example, the layer 908a may represent a buried oxide (BOX) layer, and the layer 908b may represent an optional cap. Each of the layers 908a-908b may also be formed in any suitable manner, such as by depositing material(s) on another layer and etching or otherwise processing the material(s). In addition, each of the layers 908a-908b may have any suitable dimensions. In some embodiments, the layer 908a may have a thickness of about 100 nm to about 2000 nm.

Depending on the implementation, the antenna element 604 of the unit cell 602 may be fabricated in the photonics layer 902 or in one or more of the layers 906a-906b. In this example, it is assumed that the antenna element of the unit cell 602 is fabricated in the photonics layer 902. Optical signals are provided to and/or received from the unit cell 602 using an optical fiber 910, which may represent an optical waveguide or other suitable structure. Electrical signals used by the unit cell 602 (such as signals for controlling the modulator 608 of the unit cell 602) are provided to the unit cell 602 using one or more conductive vias 912. The one or more conductive vias 912 are electrically coupled to conductive pads 914, which may contact one or more solder bumps 916 (such as indium solder bumps) carried by an interposer layer 918. The layers 904c and 918 can be separated from one another by any suitable distance to accommodate the conductive pads 914, solder bumps 916, or other components, such as a distance of about 1110 nm. Note, however, that any other suitable mechanisms may be used to transport optical and electrical signals to and from the unit cell 602.

A carrier layer 920 represents a substrate or other layer of material that is used to carry the unit cell 602. The carrier layer 920 may be formed using any suitable material(s), such as silicon. The carrier layer 920 may also be formed in any suitable manner. In addition, the carrier layer 920 may have any suitable dimensions, such as a thickness of about 775 μm or more.

As shown in this particular example, the unit cell 602 may be configured to transmit and/or receive optical signals 922. The direction of transmission and/or reception upward in FIG. 9 is obtained using a reflector 924 that is included in the layer 904a (or another layer of the stack). With the reflector 924, the photonics layer 902 may transmit and/or receive the optical signals 922 through the top of the stack as shown in FIG. 9. Without the reflector 924, the photonics layer 902 may be configured to transmit and/or receive optical signals through the bottom of the stack. The reflector 924 may be formed using any suitable reflective material(s), such as one or more metals. The reflector 924 may also be formed in any suitable manner, such as by depositing material(s) on another layer and etching or otherwise processing the material(s). In addition, the reflector 924 may have any suitable dimensions, such as a length of about 100 nm to about 300 nm. Note, however, that the unit cell 602 may be configured to transmit and/or receive optical signals 922 in the same direction shown here without using a reflector 924.

An optional quarter waveplate 926 is positioned above the antenna element 604 of the unit cell 602, which may be formed in the photonics layer 902 or in one or more of the layers 906a-906b as noted above. The quarter waveplate 926 is configured to transform linearly-polarized light into circularly-polarized light and vice versa. Thus, the quarter waveplate 926 can transform linearly-polarized light received from the antenna element 604 into circularly-polarized light for outgoing transmission. The quarter waveplate 926 can also or alternatively transform incoming circularly-polarized light that is received into linearly-polarized light for reception by the antenna element 604. The quarter waveplate 926 may be formed using any suitable material(s), such as one or more birefringent materials. In some embodiments, the quarter waveplate 926 may be formed using quartz or one or more polymers. Also, the quarter waveplate 926 may be formed in any suitable manner, such as by depositing material(s) on another layer and etching or otherwise processing the material(s). In addition, the quarter waveplate 926 may have any suitable dimensions, such as a thickness of about 44000 nm. Note that while a single quarter waveplate 926 here is shown above the antenna element 604 of the unit cell 602, the single quarter waveplate 926 or another quarter waveplate may be positioned below the antenna element 604 of the unit cell 602 (if transmission/reception can occur in the opposite direction). Also note that while the quarter waveplate 926 here is shown as being formed using a flat layer of material, non-planar embodiments of the quarter waveplate 926 are possible, such as a quarter waveplate 926 with a curved or stepped upper surface. In some embodiments, the quarter waveplate 926 can be implemented using a "zero order" waveplate, which means that the quarter waveplate 926 may have little if any operational variation based on temperature. In some cases, this type of quarter waveplate 926 may be formed using two "multiple order" quartz waveplates or other waveplates having their axes crossed, where one waveplate is stacked on top of the other.

A circuit implementing an inertial reference gyroscopic unit (IRGU) or other gyroscopic circuitry 928, which includes a gyroscopic sensor, is integrated into the stack of the photonic integrated circuit 502. One example implementation of the gyroscopic circuitry 928 is provided below. The gyroscopic circuitry 928 can be incorporated into one or more layers of the photonic integrated circuit 502 that are shown in FIG. 9. In some embodiments, for example, the gyroscopic circuitry 928 may be implemented in one or more layers 930 identified in FIG. 9. In particular embodiments, at least a gyroscopic sensing coil or a resonant cavity layer of the gyroscopic circuitry 928 may be implemented in one or more layers 932 identified in FIG. 9. Note, however, that the gyroscopic circuitry 928 may be integrated in any other suitable manner within the photonic integrated circuit 502. Since the gyroscopic circuitry 928 is integrated into the photonic integrated circuit 502, angular motions and other motions of the photonic integrated circuit 502 may be determined with less error, which is due to the lack of physical separation of the antenna elements 604 of the photonic integrated circuit 502 and the gyroscopic circuitry 928. This can eliminate any relative boresight errors since the physical separation can be on the order of microns instead of around a meter or more for typical space-based implementations.

Although FIG. 9 illustrates one example of a cross-section of a unit cell 602 in a PIC-based optical phased array with an integrated gyroscopic sensor, various changes may be made to FIG. 9. For example, various layers in the unit cells 602 may be combined, further subdivided, replicated, omitted, or rearranged and additional layers may be added according to particular needs. In general, the unit cells 602 described in this disclosure may be implemented in any suitable manner using any suitable layers of material. Also, the specific materials and dimensions of the various layers described above are for illustration only and can vary as needed or desired.

Figure 10:
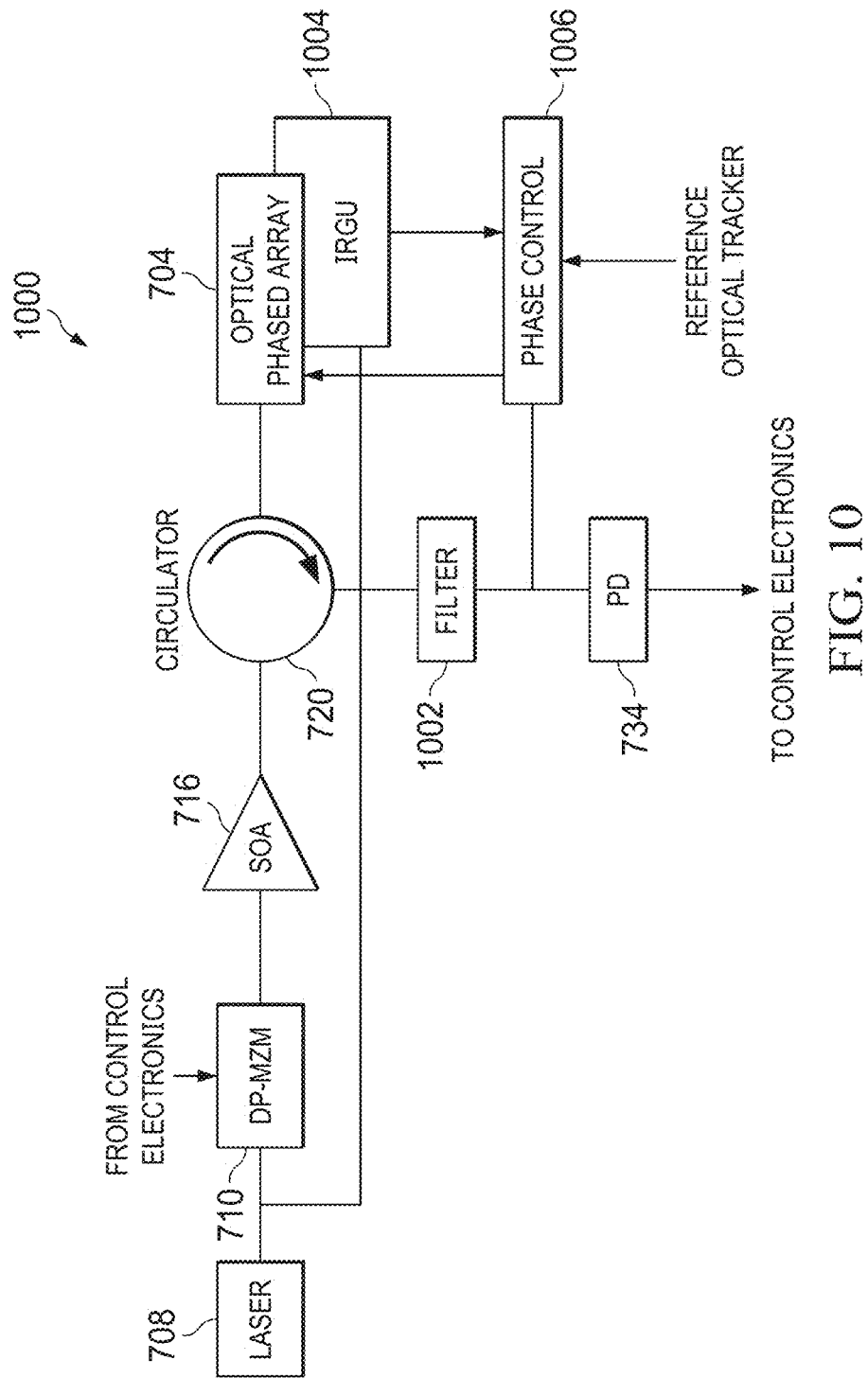
FIGS. 10 and 11 illustrate an example architecture incorporating an inertial reference gyroscopic unit (IRGU) into a photonic integrated circuit according to this disclosure.
Figure 11:
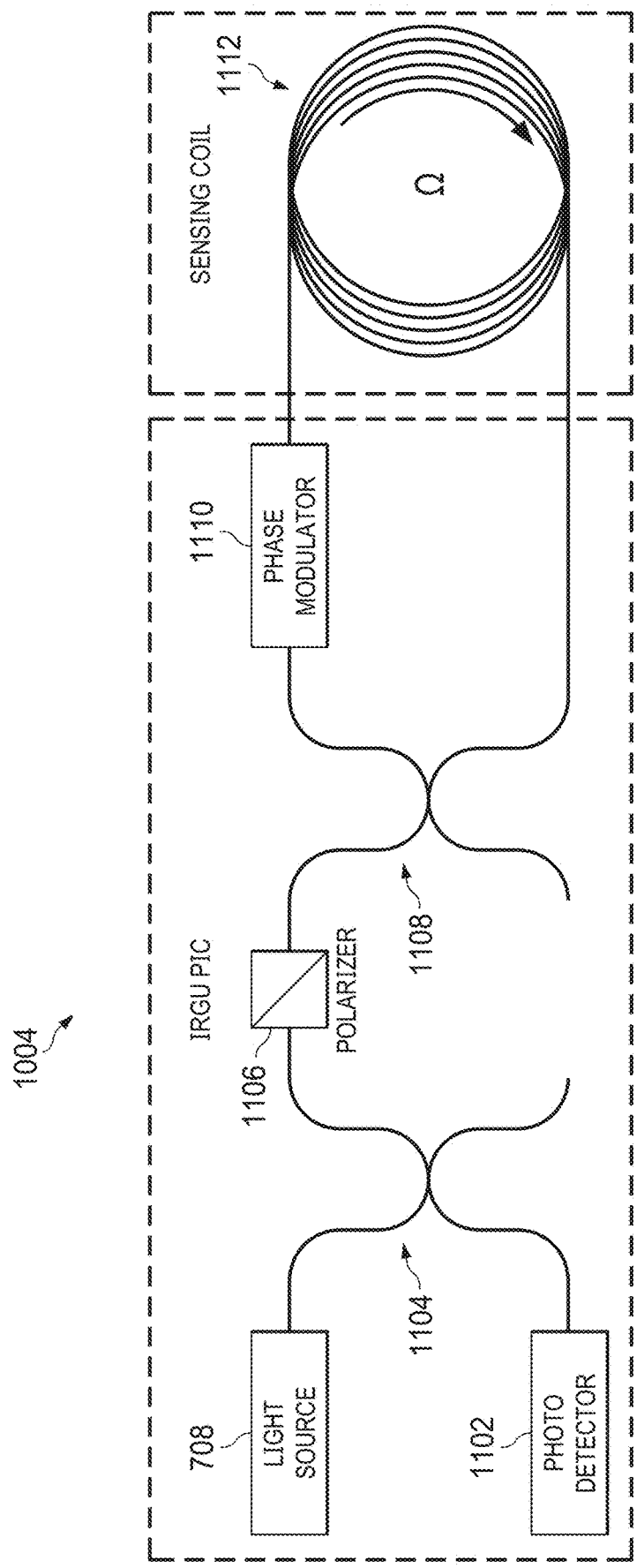

FIGS. 10 and 11 illustrate an example architecture 1100 incorporating an inertial reference gyroscopic unit (IRGU) into a photonic integrated circuit according to this disclosure. For ease of explanation, the architecture 1100 is described as being used with the photonic integrated circuit 502 in the optical device 400, where the photonic integrated circuit 502 supports the architecture 700. However, the architecture 1100 may be used with any other suitable photonic integrated circuit, which may be used in any other suitable device and in any other suitable system.

As shown in FIG. 10, the output from the laser 708 is provided to the EOM 710, which in this example may be implemented using a dual parallel Mach-Zehnder modulator (DP-MZM). The modulated signal is provided to the array of semiconductor optical amplifiers 716, and the amplified signal is provided via the circulator 720 to the OPA 704 for use during transmissions of outgoing optical signals. Incoming optical signals received by the OPA 704 can be provided to one or more photo detectors 734 via the circulator 720 and a filter 1002, such as a band pass or other optical filter that filters the wavelength(s) of the incoming optical signals. Inputs to the EOM 710 and outputs from the photodetector(s) 734 here may be respectively received from and provided to control electronics, such as the electronic control board 508. Note that various components from FIG. 7 are omitted here for ease of illustration and explanation.

A portion of the output from the laser 708 is also provided to an IRGU 1004. The IRGU 1004 modifies the laser output from the laser 708 based on movement of the IRGU 1004. The modifications to the laser output from the laser 708 can be sensed in order to identify movements of the photonic integrated circuit 502. One example embodiment of the IRGU 1004 is discussed below with reference to FIG. 11.

Information related to a reference position (such as from a tracker 126 or 128) and outputs of the IRGU 1004 are provided to a phase controller 1006. The phase controller 1006 may also receive samples of the filtered incoming optical signals, such as 10% samples or other samples of the outputs of the filter 1002. The phase controller 1006 generally uses these inputs to determine how the photonic integrated circuit 502 is moving. For instance, the phase controller 1006 can use the information from the tracker 126 or 128 to identify a drift of the IRGU 1004 from a reference position, and the phase controller 1006 can use the information from the IRGU 1004 to identify sensed movements of the photonic integrated circuit 502. The phase controller 1006 can collectively use this information to precisely identify the motions of the photonic integrated circuit 502, such as with reference to another device. In some cases, these types of calculations may be the same as or similar to operations often performed in spacecraft, where a tracker (such as a camera with a star reference map stored in memory) is utilized to compensate for satellite gyroscopic drift. The phase controller 1006 can then use the determined motions of the photonic integrated circuit 502 to adjust the operation of the OPA 704 (such as by adjusting the modulators 608, the phase shifters 714, or both) in order to compensate for the motions of the photonic integrated circuit 502, such as by adjusting phases of unit cells 602 in the OPA 704 to maintain optical communications with another device.

As shown in FIG. 11, the laser 708 and a photodetector 1102 are coupled to different ports of an optical coupler 1104, which may represent a 2×2 optical coupler and which in some cases may be formed using two separate 1×2 optical couplers. The optical coupler 1104 is also coupled to a polarizer 1106. The polarizer 1106 is coupled to another optical coupler 1108, which is coupled to a phase modulator 1110. The optical coupler 1108 may represent a 2×2 optical coupler, which in some cases may be formed using two separate 1×2 optical couplers. The output of the phase modulator 1110 is coupled to a sensing coil 1112, which is also coupled to the optical coupler 1108.

In this example, light from the laser 708 passes through the optical coupler 1104 to the polarizer 1106, which can polarize the light so that the light has a desired polarization. The polarized light passes through the optical coupler 1108 to the phase modulator 1110, which can modulate the phase of the light. The modulated light passes through the sensing coil 1112, which modifies the light based on movement (if any) of the IRGU 1004. In particular, the sensing coil 1112 can modify the light based on any motion creating changes in angular velocity $\Omega$. The modified light travels back through the optical couplers 1104, 1108 and the polarizer 1106 to the photodetector 1102, which can generate measurements based on the modified light. This allows the IRGU 1004 to modify light based on movement of the IRGU 1004 and sense the modifications to the light, which thereby allows for sensing of movements of the photonic integrated circuit 502. These sensed movements can be used by the phase controller 1006 (along with other information like measurements associated with a reference location) to identify motions of the photonic integrated circuit 502, such as relative to another device having another photonic integrated circuit 502.

The photodetector 1102 includes any suitable structure that converts incoming optical signals into electrical currents, such as a photodiode. Each optical coupler 1104, 1108 represents any suitable structure configured to optically couple different components. The polarizer 1106 includes any suitable structure configured to control the polarization of light. The phase modulator 1110 includes any suitable structure configured to modulate the phase of optical signals, such as a resonant micro-ring modulator or a PN junction micro-ring modulator. The sensing coil 1112 includes any suitable waveguide configured to transport optical signals and modify optical signals based on movement, such as a coiled optical fiber or other coiled waveguide. In some cases, the sensing coil 1112 may be implemented within the photonic integrated circuit 502 itself, such as when the sensing coil 1112 is formed in a silicon nitride layer (like one of the layers 906a-906b). In other cases, the sensing coil 1112 may be implemented external to the photonic integrated circuit 502 and optically coupled to the photonic integrated circuit 502. Alternatively, in some cases, the sensing coil 1112 may represent or be replaced with a resonant cavity, such as one is formed in a layer of the photonic integrated circuit 502 (like one of the layers 906a-906b).

Although FIGS. 10 and 11 illustrate one example of an architecture 1100 incorporating an IRGU 1004 into a photonic integrated circuit 502, various changes may be made to FIGS. 10 and 11. For example, the IRGU 1004 may include any other suitable components configured to produce gyroscopic measurements associated with a photonic integrated circuit 502.

As described above, various modulators (such as the modulators 608, modulators implementing the phase shifters 714, and the modulator 1110) may be implemented in various ways. In some embodiments, optical phase shifts may be provided using a modulator by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 µW each).

Figure 12:
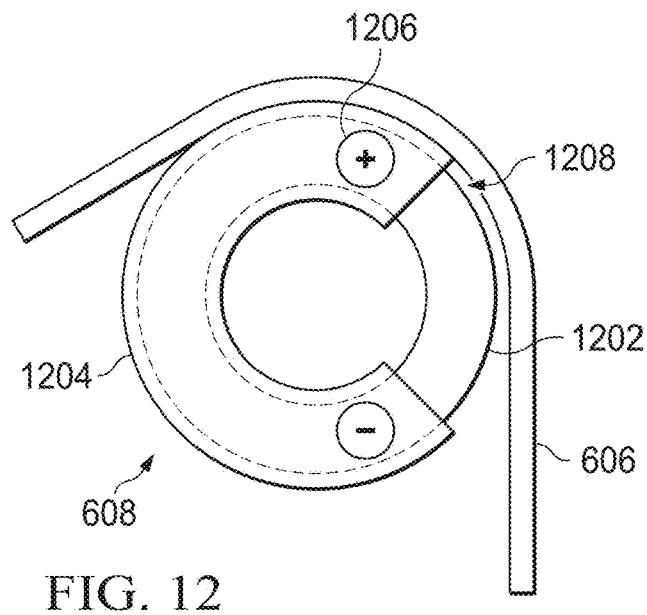
FIGS. 12 and 13 illustrate example modulators in a photonic integrated circuit according to this disclosure.
Figure 13:
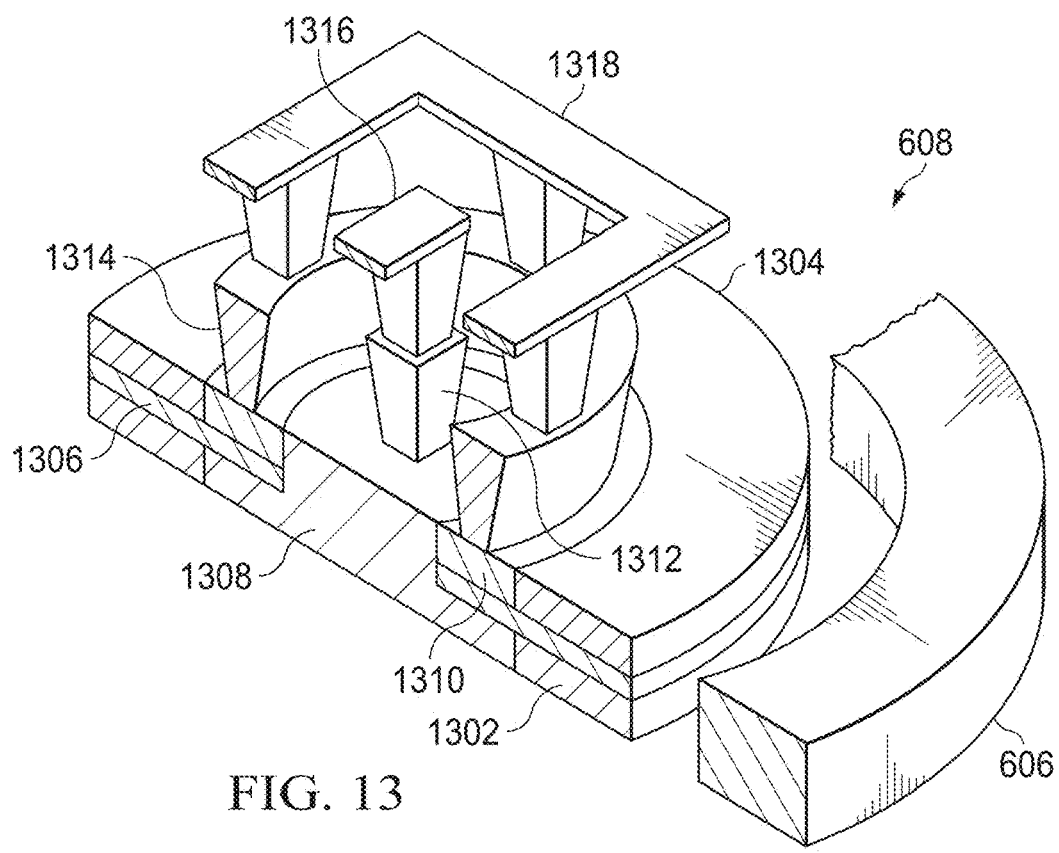

FIGS. 12 and 13 illustrate example modulators 608 in a photonic integrated circuit 502 according to this disclosure. The same or similar types of structures may be used in the phase shifters 714 and the modulator 1110. As shown in FIG. 12, the modulator 608 here represents a thermal resonator that is implemented using a micro-ring resonator 1202 and a heater 1204 positioned above or otherwise near the micro-ring resonator 1202. The micro-ring resonator 1202 resonates based on an optical signal flowing through an associated signal pathway 606. Varying the temperature of the micro-ring resonator 1202 alters the resonance wavelength of the micro-ring resonator 1202, thereby changing the phase of the optical signal flowing through the signal pathway 606. Voltages can be applied to two electrical contacts 1206 of the heater 1204 in order to create the desired temperature change and therefore implement the desired phase shift of the optical signal flowing through the signal pathway 606. The voltages applied to the electrical contacts 1206 of the heater 1204 can represent the output voltages from the amplifiers 616 and 618. When the modulator 608 is used in a unit cell 602, different voltages applied to the heater 1204 by the corresponding DRIIC cell 612 can cause different phase shifts to occur in the modulator 608.

The micro-ring resonator 1202 may be formed from any suitable material(s), such as silicon, and in any suitable manner. The heater 1204 may be formed from any suitable material(s), such as one or more metals, and in any suitable manner. The micro-ring resonator 1202 may be separated from the heater 1204 by any suitable material(s), such as silicon dioxide. The micro-ring resonator 1202 and heater 1204 may each have any suitable size, shape, and dimensions. In some embodiments, the micro-ring resonator 1202 is annular and has a diameter of about 5.5 µm, and the heater 1204 is crescent-shaped and has a diameter of about 5.5 µm. However, other shapes and sizes may be used here. The electrical contacts 1206 of the heater 1204 here can be coupled to the outputs of the corresponding DRIIC cell 612 or another component in any suitable manner, such as via flip-chip bonding. A gap 1208 between the micro-ring resonator 1202 and the signal pathway 606 may have any suitable value, such as about 150 nm to about 210 nm (±10 nm). In some cases, design parameters like the thickness of the micro-ring resonator 1202 or the size of the gap 1208 can be altered in order to provide desired functionality for the phase modulator 608.

As shown in FIG. 13, the modulator 608 here represents a PN junction micro-ring modulator that is implemented using various regions of semiconductor material, such as doped and undoped silicon. In this example, the modulator 608 is shown in cross-section for explanation. Here, the modulator 608 includes a first annular semiconductor region 1302 separated from a second annular semiconductor region 1304. The annular semiconductor regions 1302 and 1304 can represent different types of semiconductor material, such as when the annular semiconductor region 1302 represents an N-type semiconductor material and the annular semiconductor region 1304 represents a P-type semiconductor material. A semiconductor region 1306 (such as undoped silicon) can separate the regions 1302-1304. A doped semiconductor region 1308 is positioned within the annular regions 1302-1304, and a doped semiconductor region 1310 is positioned around an upper portion of the doped semiconductor region 1308. The doped semiconductor regions 1308 and 1310 can represent different regions of semiconductor material with different dopants, such as when the doped semiconductor region 1308 is doped with an N+ dopant and the doped semiconductor region 1310 is doped with a P+ dopant. An electrical contact 1312 can be used to form an electrical connection with the doped semiconductor region 1308, and an electrical contact 1314 can be used to form an electrical connection with the doped semiconductor region 1310. An electrical connection 1316 can be used to provide a voltage to the electrical contact 1312, and an electrical connection 1318 can be used to provide a voltage to the electrical contact 1314.

Here, the various semiconductor regions 1302-1310 form a PN junction micro-ring modulator, and the electrical contacts 1312, 1314 and electrical connections 1316, 1318 allow voltages to be applied that alter the charge carrier density of the PN junction micro-ring modulator. This alters the phase of an optical signal flowing through the associated signal pathway 606. When the modulator 608 is used in a unit cell 602, the electrical connections 1316, 1318 here can be coupled to the outputs of the corresponding DRIIC cell 612 in any suitable manner, such as via flip-chip bonding. Voltages applied to the electrical connections 1316, 1318 can provide the desired voltage difference and therefore implement the desired phase shift of the optical signal flowing through the signal pathway 606. The voltages applied to the electrical connections 1316, 1318 can represent the output voltages from the amplifiers 616 and 618. As noted above, different voltages applied to the electrical connections 1316, 1318 by the corresponding DRIIC cell 612 or another component can cause different phase shifts to occur in the modulator 608.

Although FIGS. 12 and 13 illustrate examples of modulators 608 in a photonic integrated circuit 502, various changes may be made to FIGS. 12 and 13. For example, the actual structure of a thermal resonator or PN junction micro-ring modulator can vary as needed or desired. Also, any other suitable structure may be used to modulate an optical signal in the photonic integrated circuit 502.

The following describes example embodiments of this disclosure that implement or relate to PIC-based optical phased arrays with integrated gyroscopic sensors. However, other embodiments may be used in accordance with the teachings of this disclosure.

In a first embodiment, an apparatus includes a photonic integrated circuit having an optical phased array, where the optical phased array includes multiple unit cells. Each unit cell includes (i) an antenna element configured to transmit or receive optical signals and (ii) a phase modulator configured to modify phases of the optical signals being transmitted or received by the antenna element. The apparatus also includes a gyroscopic sensor configured to sense movement of the photonic integrated circuit, where at least a portion of the gyroscopic sensor is integrated within the photonic integrated circuit.

In a second embodiment, a method includes transmitting or receiving optical signals using a photonic integrated circuit having an optical phased array, where the optical phased array includes multiple unit cells. Each unit cell includes (i) an antenna element that transmits or receives the optical signals and (ii) a phase modulator that modifies phases of the optical signals being transmitted or received by the antenna element. The method also includes sensing movement of the photonic integrated circuit using a gyroscopic sensor, where at least a portion of the gyroscopic sensor is integrated within the photonic integrated circuit.

In a third embodiment, an optical node includes one or more optical transmitters, optical receivers, or optical transceivers. Each optical transmitter, optical receiver, or optical transceiver includes a photonic integrated circuit having an optical phased array, where the optical phased array includes multiple unit cells. Each unit cell includes (i) an antenna element configured to transmit or receive optical signals and (ii) a phase modulator configured to modify phases of the optical signals being transmitted or received by the antenna element. Each optical transmitter, optical receiver, or optical transceiver also includes a gyroscopic sensor configured to sense movement of the photonic integrated circuit, where at least a portion of the gyroscopic sensor is integrated within the photonic integrated circuit.

Any single one or any suitable combination of the following features may be used with the first, second, or third embodiment. The photonic integrated circuit may include a stack of layers, and at least the portion of the gyroscopic sensor may be positioned within one or more of the layers in the stack. The gyroscopic sensor may include a sensing coil or resonant cavity, and the sensing coil or resonant cavity may be positioned within a silicon nitride layer in the stack. A tracking system may include an imaging sensor, and the imaging sensor may be configured to capture images of scenes in order to identify movement of the photonic integrated circuit from a reference position. The tracking system may include a star tracker. The tracking system may be configured to use a ground-based illumination optical reference light source to identify the movement of the photonic integrated circuit from a reference position. The ground-based illumination optical reference light source may include a modulated light source. A phase controller may be configured to adjust the optical phased array based on (i) the sensed movement of the photonic integrated circuit from the gyroscopic sensor and (ii) the identified movement of the photonic integrated circuit from the tracking system. The phase controller may be configured to adjust the optical phased array in order to maintain an optical link with an external device throughout the movements of the photonic integrated circuit. The photonic integrated circuit may form a part of an optical node, and the optical node may form a part of a satellite or be mounted on a cell tower.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type af medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations. A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    a photonic integrated circuit comprising an optical phased array, the optical phased array comprising multiple unit cells, each unit cell comprising (i) an antenna element configured to transmit optical signals to an external node and receive optical signals from the external node and (ii) a phase modulator configured to modify phases of the optical signals being transmitted and received by the antenna element;
    a gyroscopic sensor configured to sense movement of the photonic integrated circuit, wherein at least a portion of the gyroscopic sensor is integrated within the photonic integrated circuit; and
    a phase controller configured to adjust the optical phased array based on (i) the sensed movement of the photonic integrated circuit from the gyroscopic sensor and (ii) samples of the optical signals that are received by the photonic integrated circuit from the external node.

2. The apparatus of claim 1, wherein:
    the photonic integrated circuit comprises a stack of layers; and
    at least the portion of the gyroscopic sensor is positioned within one or more of the layers in the stack.

3. The apparatus of claim 2, wherein:
    the gyroscopic sensor comprises a sensing coil or resonant cavity; and
    the sensing coil or resonant cavity is positioned within a silicon nitride layer in the stack.

4. The apparatus of claim 1, further comprising:
    a tracking system comprising an imaging sensor, the imaging sensor configured to capture images of scenes in order to identify movement of the photonic integrated circuit from a reference position.

5. The apparatus of claim 4, wherein the tracking system comprises a star tracker.

6. The apparatus of claim 4, wherein the tracking system is configured to use a ground-based illumination optical reference light source to identify the movement of the photonic integrated circuit from a reference position.

7. The apparatus of claim 6, wherein the ground-based illumination optical reference light source comprises a modulated light source.

8. The apparatus of claim 4, wherein the phase controller is further configured to adjust the optical phased array based on the identified movement of the photonic integrated circuit from the tracking system.

9. The apparatus of claim 8, wherein the phase controller is configured to adjust the optical phased array in order to maintain an optical link with the external node throughout the movements of the photonic integrated circuit.

10. The apparatus of claim 1, wherein the photonic integrated circuit forms a part of an optical node, the optical node forming a part of a satellite or mounted on a cell tower.

11. A method comprising:
transmitting and receiving optical signals using a photonic integrated circuit comprising an optical phased array, the optical phased array comprising multiple unit cells, each unit cell comprising (i) an antenna element that transmits the optical signals to an external node and receives the optical signals from the external node and (ii) a phase modulator that modifies phases of the optical signals being transmitted and received by the antenna element;
sensing movement of the photonic integrated circuit using a gyroscopic sensor, wherein at least a portion of the gyroscopic sensor is integrated within the photonic integrated circuit; and
adjusting the optical phased array based on (i) the sensed movement of the photonic integrated circuit from the gyroscopic sensor and (ii) samples of the optical signals that are received by the photonic integrated circuit from the external node.

12. The method of claim 11, wherein:
the photonic integrated circuit comprises a stack of layers; and
at least the portion of the gyroscopic sensor is positioned within one or more of the layers in the stack.

13. The method of claim 12, wherein:
the gyroscopic sensor comprises a sensing coil or resonant cavity; and
the sensing coil or resonant cavity is positioned within a silicon nitride layer in the stack.

14. The method of claim 11, further comprising:
using an imaging sensor of a tracking system to capture images of scenes in order to identify movement of the photonic integrated circuit from a reference position.

15. The method of claim 14, wherein the tracking system comprises a star tracker.

16. The method of claim 14, wherein the tracking system uses a ground-based illumination optical reference light source to identify the movement of the photonic integrated circuit from a reference position.

17. The method of claim 14, wherein the optical phased array is adjusted further based on the identified movement of the photonic integrated circuit from the tracking system.

18. The method of claim 17, wherein the phase controller adjusts the optical phased array in order to maintain an optical link with external node throughout the movements of the photonic integrated circuit.

19. The method of claim 11, wherein the photonic integrated circuit forms a part of an optical node, the optical node forming a part of a satellite or mounted on a cell tower.

20. An optical node comprising:
one or more optical transmitters, optical receivers, or optical transceivers;
wherein at least one of the one or more optical transmitters, optical receivers, or optical transceivers comprises:
a photonic integrated circuit comprising an optical phased array, the optical phased array comprising multiple unit cells, each unit cell comprising (i) an antenna element configured to transmit optical signals to an external node and receive optical signals from the external node and (ii) a phase modulator configured to modify phases of the optical signals being transmitted and received by the antenna element;
a gyroscopic sensor configured to sense movement of the photonic integrated circuit, wherein at least a portion of the gyroscopic sensor is integrated within the photonic integrated circuit; and
a phase controller configured to adjust the optical phased array based on (i) the sensed movement of the photonic integrated circuit from the gyroscopic sensor and (ii) samples of the optical signals that are received by the photonic integrated circuit from the external node.

\* \* \* \* \*